(12) United States Patent
Tang-Petersen et al.

(10) Patent No.: US 6,885,376 B2
(45) Date of Patent: Apr. 26, 2005

(54) SYSTEM, METHOD, AND COMPUTER PROGRAM PRODUCT FOR NEAR-REAL TIME LOAD BALANCING ACROSS MULTIPLE RENDERING PIPELINES

(75) Inventors: Svend Tang-Petersen, Mountain View, CA (US); Yair Kurzion, San Jose, CA (US)

(73) Assignee: Silicon Graphics, Inc., Mountain View, CA (US)

(*) Notice: Subject to any disclaimer, the term of this patent is extended or adjusted under 35 U.S.C. 154(b) by 80 days.

(21) Appl. No.: 10/330,217

(22) Filed: Dec. 30, 2002

(65) Prior Publication Data

US 2004/0125111 A1 Jul. 1, 2004

(51) Int. Cl.[7] .................................................. G06T 1/20
(52) U.S. Cl. ...................... 345/506; 345/502; 345/505; 712/28; 712/32
(58) Field of Search ................................ 345/501, 502, 345/503, 504, 505, 506; 712/28, 31, 32

(56) References Cited

U.S. PATENT DOCUMENTS

| | | | | |
|---|---|---|---|---|
| 4,920,487 A | * | 4/1990 | Baffes ......................... | 718/105 |
| 6,191,800 B1 | * | 2/2001 | Arenburg et al. ........... | 345/505 |
| 6,683,614 B2 | * | 1/2004 | Walls et al. ................. | 345/506 |
| 2003/0005100 A1 | * | 1/2003 | Barnard et al. ............. | 709/223 |
| 2003/0164832 A1 | * | 9/2003 | Alcorn ........................ | 345/505 |
| 2003/0169269 A1 | * | 9/2003 | Sasaki et al. ................ | 345/581 |

OTHER PUBLICATIONS

Schneider, B., "Parallel Polygon Rendering" [online], [Retrieved on Jun. 9, 2003]. Retrieved from the Internet: <URL:http://www.gris.uni–tuebingen.de/~bartz/tutorials/vis2000course/s5.pdf> (7 pages).

* cited by examiner

Primary Examiner—Matthew C. Bella
Assistant Examiner—Mackly Monestime
(74) Attorney, Agent, or Firm—Sterne, Kessler, Goldstein & Fox PLLC

(57) ABSTRACT

A system, method, and computer program product for creating a sequence of computer graphics frames, using a plurality of rendering pipelines. For each frame, each rendering pipeline receives a subset of the total amount of graphics data for the particular frame. At the completion of a frame, each rendering pipeline sends a performance report to a performance monitor. The performance monitor determines whether or not there was a significant disparity in the time required by the respective rendering pipelines to render their tiles. If a disparity is detected, and if the disparity is determined to be greater than some threshold, an allocation module resizes the tiles for the next frame. This serves to balance the load across rendering pipelines for each frame.

29 Claims, 18 Drawing Sheets

SYSTEM, METHOD, AND COMPUTER PROGRAM PRODUCT FOR NEAR-REAL TIME LOAD BALANCING ACROSS MULTIPLE RENDERING PIPELINES

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The invention described herein relates to computer graphics system performance.

2. Background Art

Computer graphics systems sometimes use parallelism in order to enhance performance. In particular, a graphics system may use more than one rendering pipeline in order to create an image. In such an architecture, each pipeline is responsible for rendering some portion of a frame. When rendering is completed, the outputs of the respective rendering pipelines are combined by a compositor to produce the complete frame. Such an arrangement can significantly increase throughput. If, for example, four equivalent rendering pipelines are used, then the time necessary to render a particular frame is, on average, one fourth of the time that would be required if a single rendering pipeline were used.

This is only an average however. Such a performance enhancement is only possible if the required processing is distributed evenly across all rendering pipelines for each frame. This is typically not the case. If, for example, four rendering pipelines are used, wherein each pipeline is responsible for rendering a particular quadrant of a frame, some quadrants may require more rendering than others. If this is the case, then rendering the frame can only proceed as quickly as the slowest rendering pipeline. The frame will only be completed when the slowest pipeline is finished. An example is shown in FIG. 1. Here, a frame 100 is divided into four quadrants, 110, 120, 130 and 140. If each quadrant is assigned to a particular rendering pipeline, it is apparent that the pipeline associated with quadrant 110 will have more processing to perform, compared to the other quadrants. As a result, rendering of this frame will only be completed when the rendering pipeline associated with quadrant 110 has finished. While this example may be an extreme case, it shows that even given multiple rendering pipelines, in some situations the performance of a multiple pipeline computer graphics system may not be much better than the performance of a single pipeline computer graphics system.

Hence, there is a need for a system and method by which parallelism inherent in a computer graphics system having multiple rendering pipelines is more fully exploited. In particular, the advantages of having multiple rendering pipelines need to be realized under all circumstances.

BRIEF SUMMARY OF THE INVENTION

The invention described herein is a system, method, and computer program product for creating a sequence of computer graphics frames using a plurality of rendering pipelines. For each frame, each rendering pipeline renders a subset of the total amount of graphics data. The output of each rendering pipeline represents a portion of the frame. In an embodiment of the invention, each portion of the frame is rectangular. Each rectangle is referred to hereinafter as a tile. Each rendering pipeline is therefore responsible for the rendering of its own particular tile in a given frame. After completion of a frame, each rendering pipeline produces a performance report. The performance report states the amount of time that was required to render a tile in the current frame.

At the completion of a frame, each rendering pipeline sends its performance report to a performance monitor. The performance monitor determines whether or not there was a significant disparity between the times required by the rendering pipelines to render their tiles. If a disparity is detected, and if the disparity is determined to be significant (i.e., greater than some threshold), then an allocation module resizes the tiles for the subsequent frame. If this is the case, the rendering pipeline bearing the largest processing load will have its tile reduced in size for purposes of the subsequent frame. This reduces the load of this pipeline. The rendering pipeline having the lowest processing load, as evidenced by its performance report, will then have its tile increased in size. The load on this pipeline is therefore increased. The latter pipeline will therefore have more processing to perform for purposes of the subsequent frame, while the former pipeline will have less rendering to perform. This serves to balance the load across rendering pipelines for the subsequent frame. This represents a near real time load balancing after each frame is rendered, allowing optimal use of the parallel architecture.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

DETAILED DESCRIPTION OF THE INVENTION

I. Overview

The invention described herein is a system, method, and computer program product for creating a sequence of computer graphics frames using a plurality of rendering pipelines. For each frame, each rendering pipeline renders a subset of the total amount of graphics data. The output of each rendering pipeline represents a portion of the frame. In an embodiment of the invention, each portion of the frame is rectangular. Each rectangle is referred to hereinafter as a tile. Each rendering pipeline is therefore responsible for the rendering of its own particular tile in a given frame. After completion of a frame, each rendering pipeline then produces a performance report. The performance report states the amount of time that was required to render a tile in the current frame. At the completion of a frame, each rendering pipeline sends its performance report to a performance monitor. The performance monitor determines whether or not there was a significant disparity between the times required by the rendering pipelines to render their tiles. If a disparity is detected, and if the disparity is determined to be significant (i.e., greater than some threshold), then an allocation module resizes the tiles for the subsequent frame. If this is the case, the rendering pipeline bearing the largest processing load will have its tile reduced in size for purposes of the subsequent frame. This reduces the load of this pipeline. The rendering pipeline having the lowest processing load, as evidenced by its performance report, will then have its tile increased in size. The load on this pipeline is therefore increased. The latter pipeline will therefore have more processing to perform for purposes of the subsequent frame, while the former pipeline will have less rendering to perform. This serves to balance the load across rendering pipelines for the subsequent frame such that relatively little latency is experienced. This represents a near real time load balancing after each frame is rendered, allowing optimal use of the parallel architecture.

Figure 1:
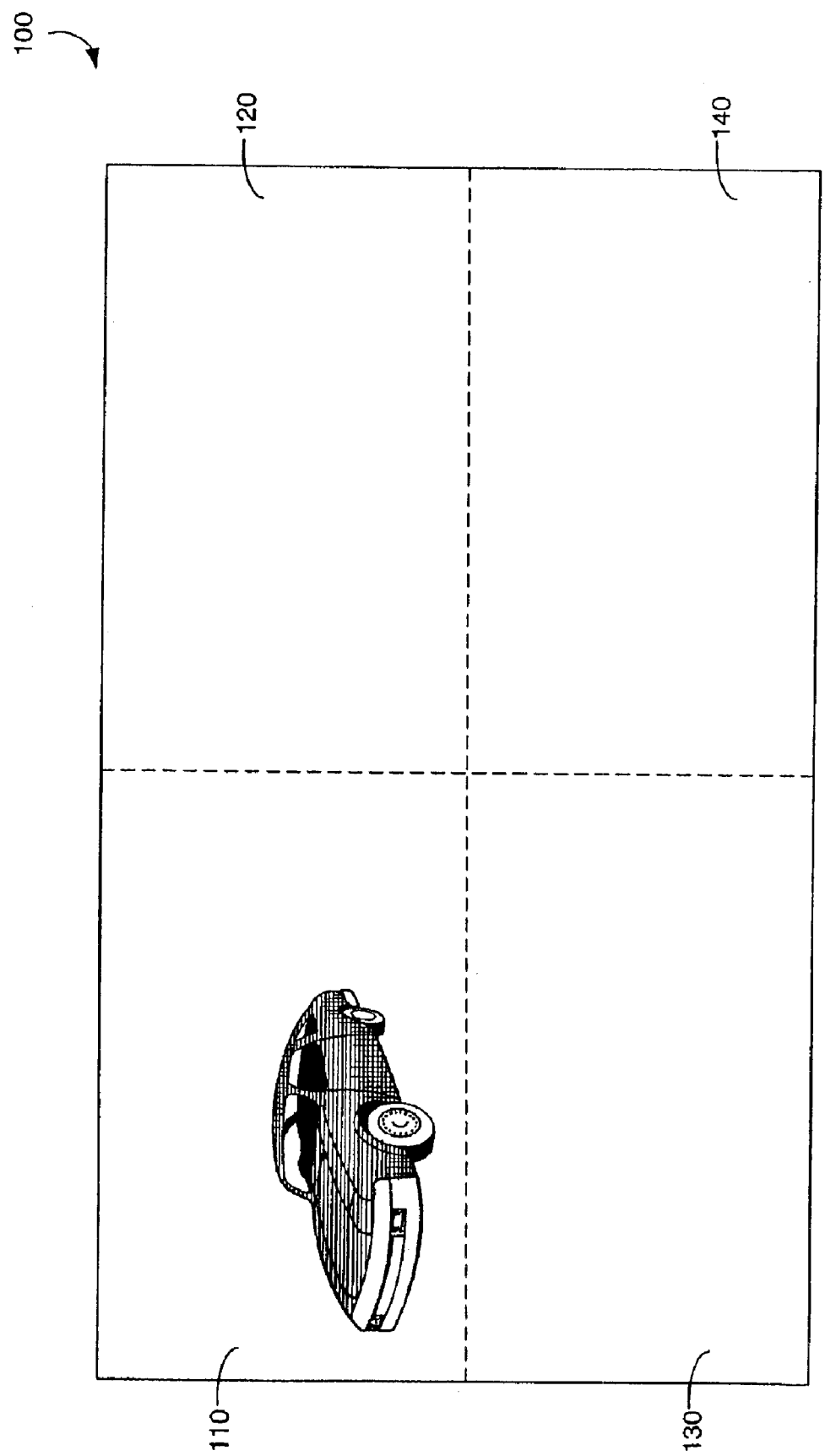
FIG. 1 illustrates a frame in which significantly more rendering is required for one tile, compared to the other tiles.
Figure 2:
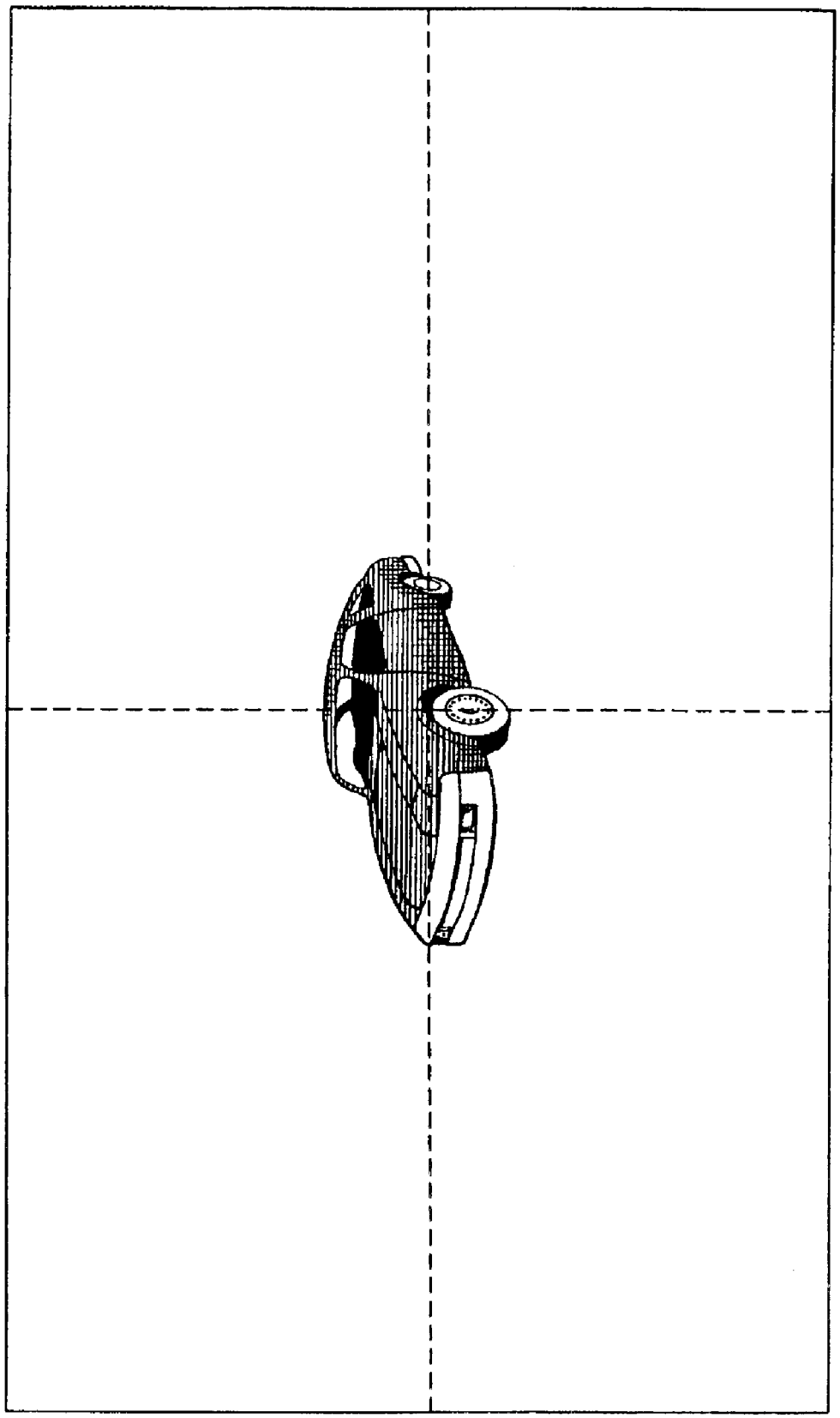
FIG. 2 illustrates a frame in which rendering is required for all tiles.

FIG. 2 illustrates a frame that has been subdivided into four tiles. A separate rendering pipeline is responsible for each tile. Hence, a first rendering pipeline renders the upper left quadrant of the frame of FIG. 2; a second rendering pipeline renders the upper right quadrant of the frame; etc. When each rendering pipeline has completed it processing, the four resulting tiles are combined to form the frame of FIG. 2.

Figure 3:
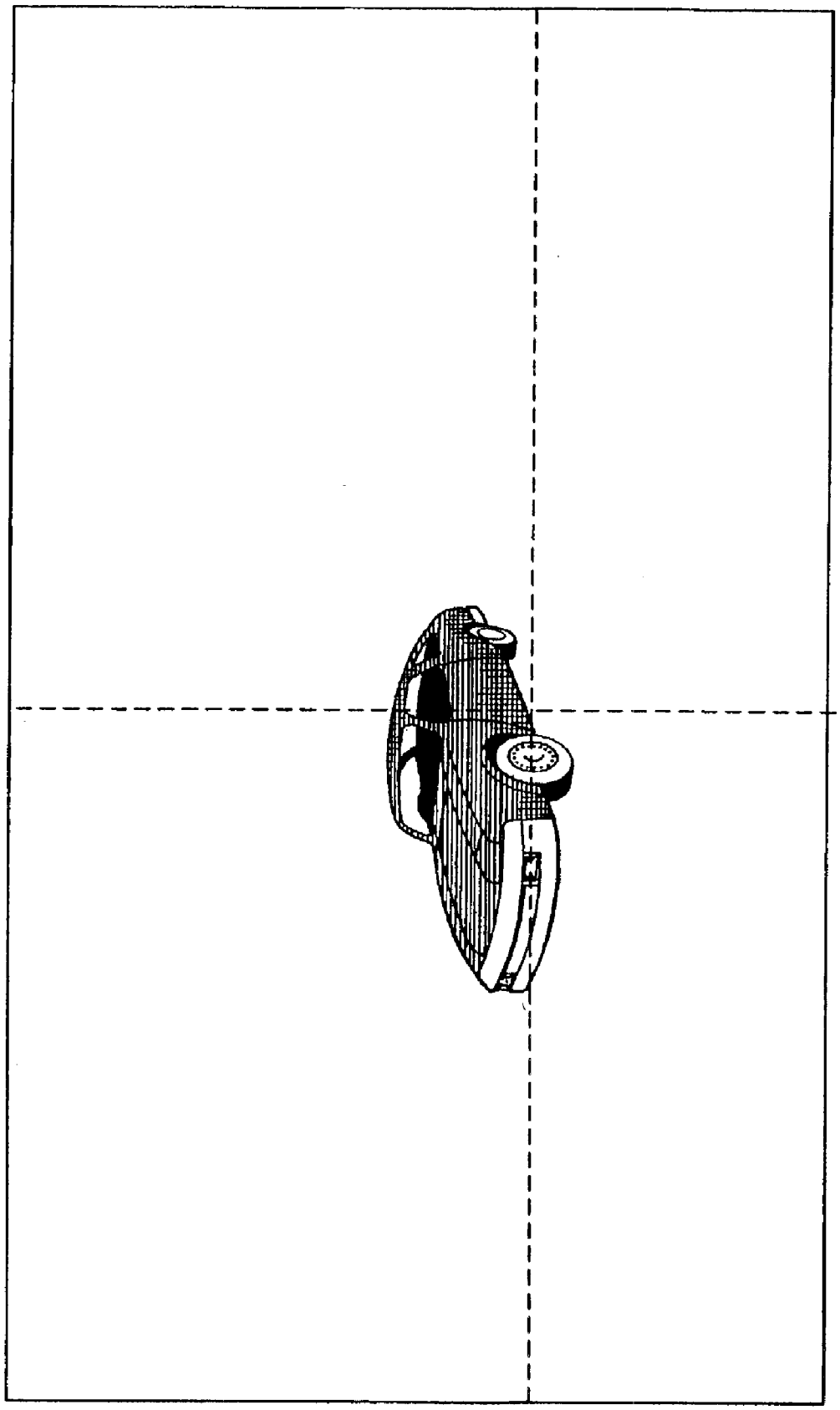
FIG. 3 illustrates a frame in which tiles have been resized to adjust the processing required in the respective rendering pipelines.

After rendering is completed for the current frame, each rendering pipeline constructs and submits a performance report to the performance monitor. The performance monitor determines whether there is a disparity in the processing burdens of the respective rendering pipelines. If it is determined, for example, that one or both of the upper tiles took significantly longer to render than one or both of the lower tiles, then the processing load is not balanced evenly among the rendering pipelines. The tiles will be resized to reallocate the processing burden among the rendering pipelines. One possible result is shown in FIG. 3. Here, the horizontal boundary separating the upper and lower tiles has been shifted down. Both upper quadrants are now larger; both lower quadrants are now smaller. As a result, each of the two rendering pipelines responsible for the upper tiles are responsible for rendering more of the frame. Moreover, the two rendering pipelines responsible for rendering the two lower tiles are responsible for less of the frame.

Figure 4:
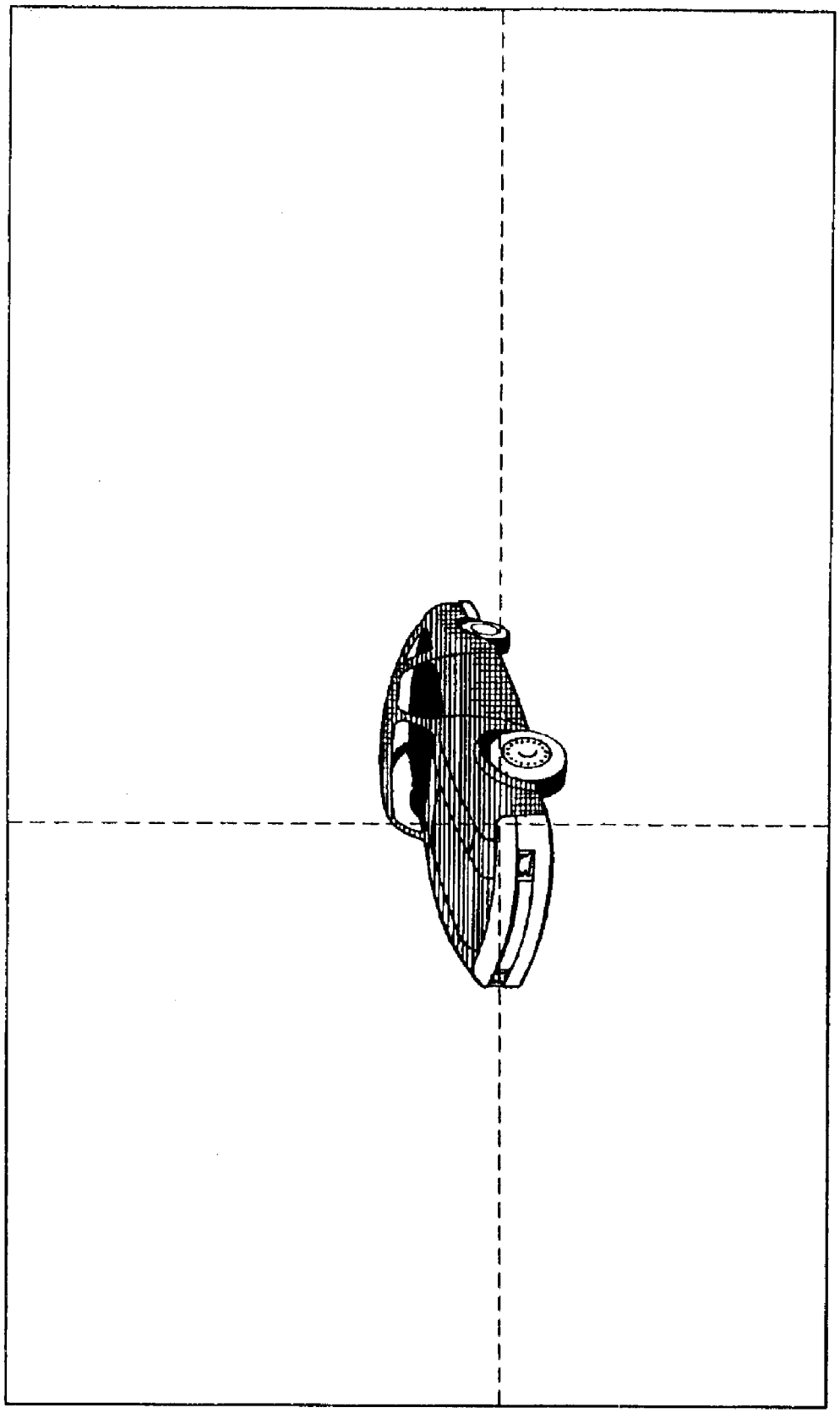
FIG. 4 illustrates a frame in which tiles are further resized, to further reallocate the processing burden across rendering pipelines.

FIG. 4 illustrates a case where the horizontal boundary is lowered and the vertical boundary is moved to the left, relative to the frame of FIG. 2. Again, this adjusts the processing workload of each of the four rendering pipelines. The rendering pipeline associated with the upper right tile has the greatest increase in rendering workload. The rendering pipeline responsible for the lower left tile of the frame has the largest decrease in rendering workload.

II. System

Figure 5:
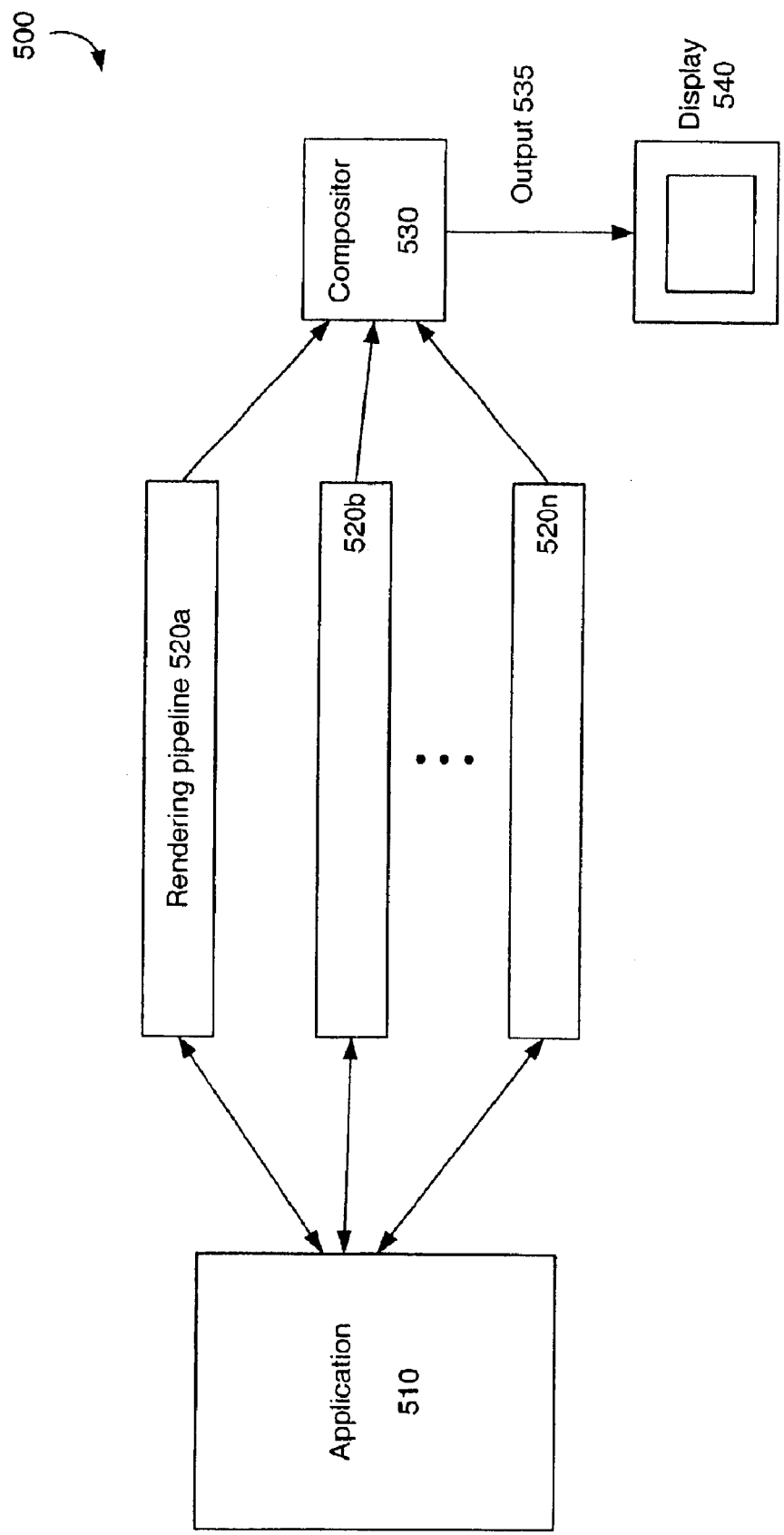
FIG. 5 illustrates the overall system according to an embodiment of the invention.

The system of the invention is illustrated generally in FIG. 5. Computer graphics system 500 includes a graphics application program 510. Application 510 is in communication with each of rendering pipelines 520*a*–520*n*. This allows the distribution of graphics data from application 510 to each of the rendering pipelines 520*a*–520*n*. At the completion of rendering, each rendering pipeline sends a performance report to a performance monitor (not shown). In an embodiment of the invention, the performance monitor is implemented as part of application 510. Each pipeline's performance report indicates the amount of time required by that pipeline to render its tile of the current frame. Moreover, each of rendering pipelines 520*a*–520*n* sends rendered data associated with its tile to a compositor 530. Compositor 530 then combines the rendered data, i.e., the tiles, to produce output 535, which can then be displayed at display 540. In alternative embodiments of the invention, output 535 can be sent to a different form of input/output (I/O) device, such as a printer or a memory medium.

Figure 6:
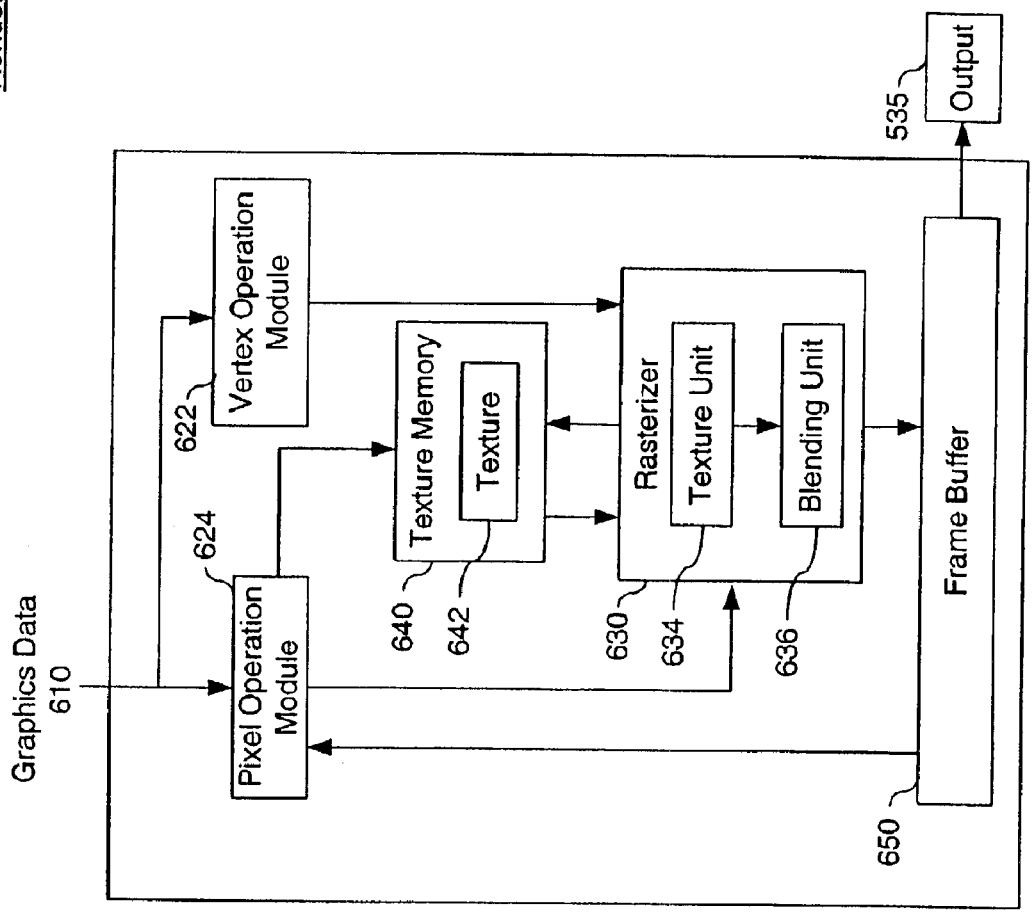
FIG. 6 is a block diagram illustrating a rendering pipeline in greater detail, according to an embodiment of the invention.

FIG. 6 illustrates a rendering pipeline in greater detail. Rendering pipeline 600 is illustrative and not intended to limit the scope of the present invention. Other types of rendering pipelines can be used as would be apparent to a person skilled in the art, given this description. Therefore, while rendering pipelines 520*a* through 520*n* can have the structure shown in FIG. 6, other embodiments of rendering pipelines can be used. Moreover, rendering pipelines 520a through 520n need not be identical.

Rendering pipeline 600 comprises a vertex operation module 622, a pixel operation module 624, a rasterizer 630, a texture memory 640, and a frame buffer 650. Rendering pipeline receives graphics data 610, which is initially routed to vertex operation module 622 and a pixel operation module 624. Texture memory 640 can store one or more textures or images, such as texture 642. Texture memory 640 is connected to a texture unit 634 by a bus (not shown). Rasterizer 630 comprises texture unit 634 and a blending unit 636. Texture unit 634 and blending unit 636 can be implemented separately or together as part of a graphics processor. The operation of these features of rendering pipeline 600 would be known to a person skilled in the relevant art given the description herein.

In embodiments of the present invention, texture unit 634 can obtain either a point sample or a filtered texture sample from textures and/or images 642 stored in texture memory 640. Blending unit 636 blends texels and/or pixel values according to weighting values to produce a single texel or pixel. The output of texture unit 638 and/or blending unit 636 is stored in frame buffer 650. The contents of frame buffer 650 can then be read out as output 670.

Figure 7:
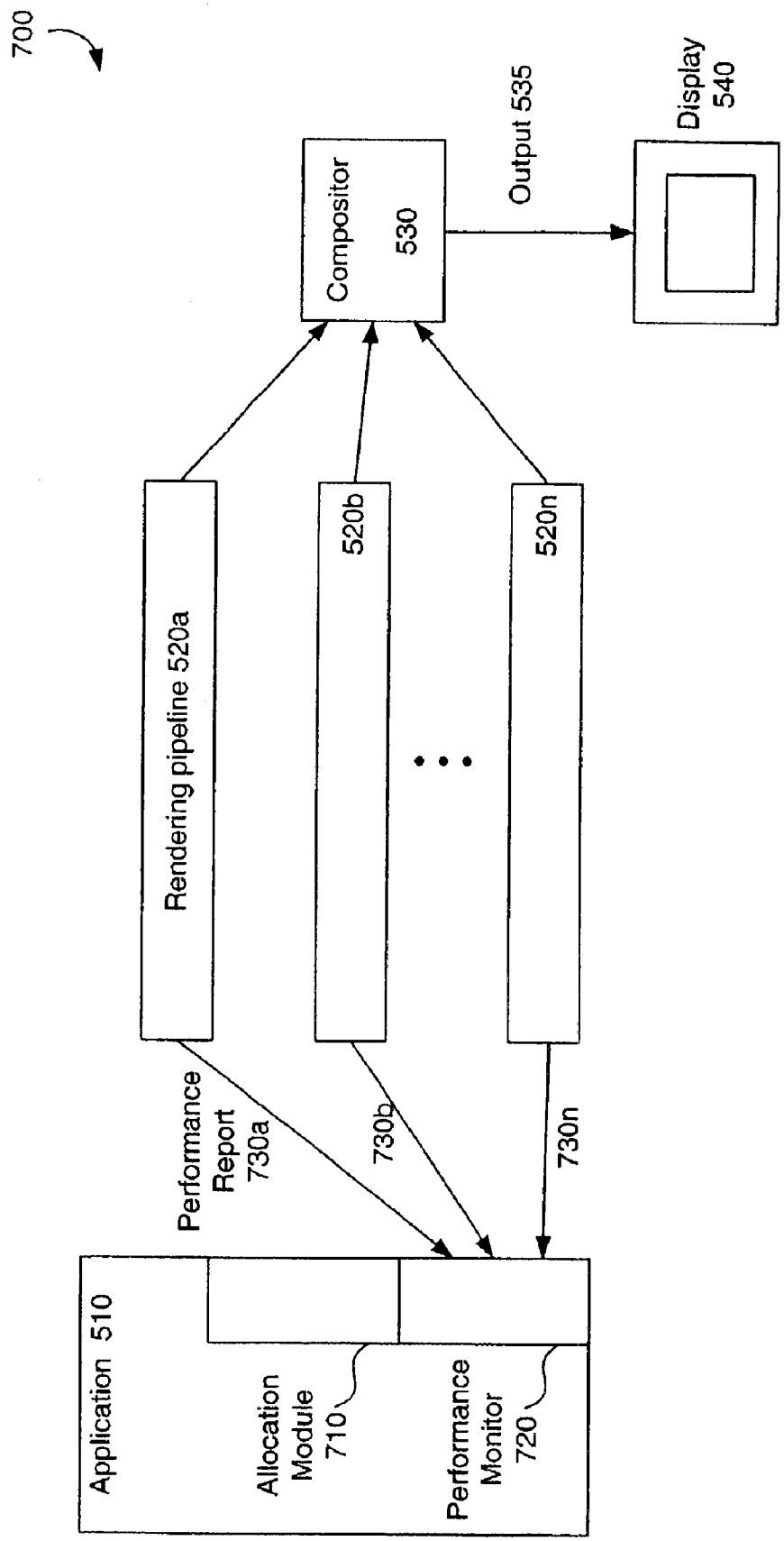
FIG. 7 illustrates an embodiment of the invention, wherein the performance monitor and allocation module are incorporated in the graphics application.

FIG. 7 illustrates the system of the invention in greater detail during its performance reporting operation. Each of the rendering pipelines 520a–520n send a performance report, labeled 730a–730n, respectively, to a performance monitor 720. In the illustrated embodiment, performance monitor 720 is incorporated in application 510. Performance reporting takes place after rendering each frame. Performance monitor 720 determines whether the performance reports indicate any disparity in the workloads of the respective rendering pipelines 520a through 520n. In an embodiment of the invention, performance monitor 720 identifies the rendering pipeline that required the greatest amount of time to render its tile for the current frame, and identifies the rendering pipeline that required the least amount of time to render its tile for the current frame. If the difference in the two times exceeds a threshold value, a conclusion is reached that a significant disparity exists. Such a conclusion is then passed to allocation module 710. Note that in an alternative embodiment of the invention, the workload of a rendering pipeline, as given in a performance report, is stated in terms of clock cycles.

Figure 8:
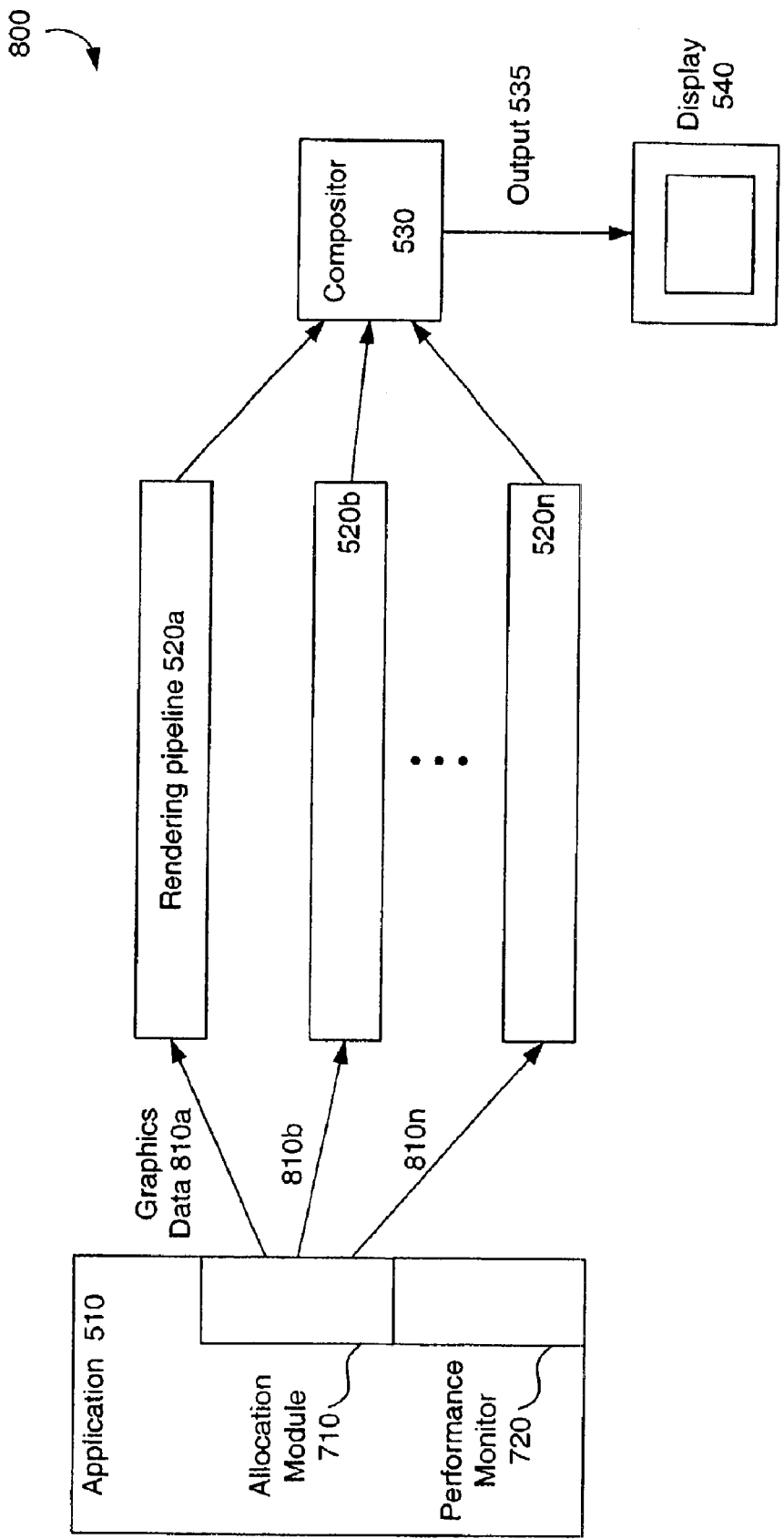
FIG. 8 illustrates graphics data being distributed to the rendering pipelines, according to an embodiment of the invention.

In FIG. 8, allocation module 710 sends graphics data to each of rendering pipelines 520a–520n. Each rendering pipeline receives a distinct subset of the total graphics data required for the subsequent frame. Hence, rendering pipeline 520a receives graphics data 810a. Likewise, rendering pipeline 520b receives graphics data 810b, etc. The graphics data sent to each rendering pipeline reflects any changes that may have been made to the sizes and shapes of the tiles associated, respectively, with rendering pipelines 520a–520n. The process of resizing tiles is performed by allocation module 710 and is described in greater detail below.

Note that in the embodiment illustrated in FIGS. 7 and 8, allocation module 710 and performance monitor 720 are shown as components of graphics application 510. In an alternative embodiment of the invention, these modules can reside external to application 510. These modules may be implemented as software, hardware, or firmware, or as some combination thereof.

Figure 9:
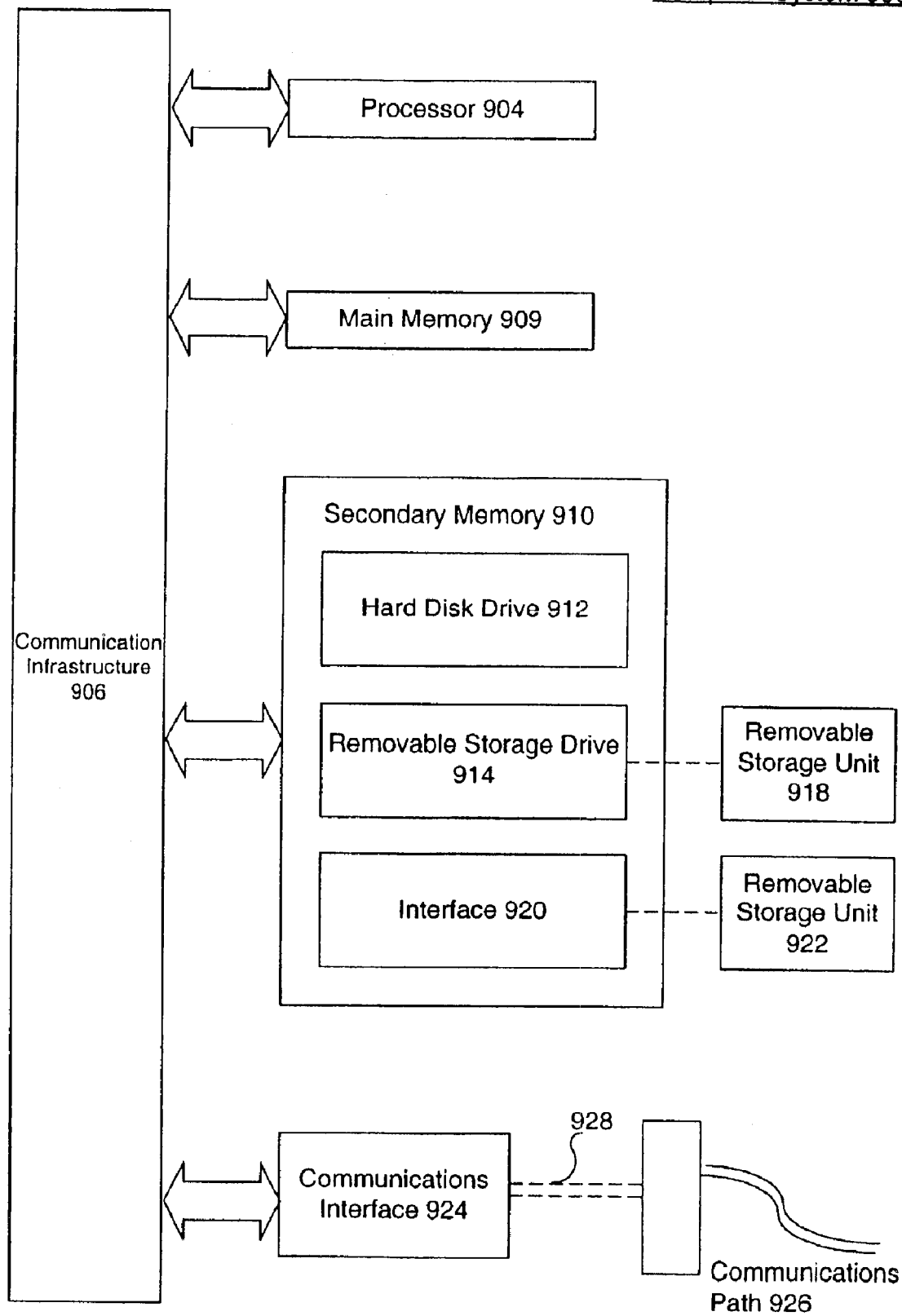
FIG. 9 is an illustration of the computing environment of an embodiment of the invention.

The allocation module 710 and performance monitor 720 of the present invention may be implemented using hardware, software or a combination thereof. In an embodiment of the invention, they are implemented in software as part of application program 510, which is executed on a computer system or other processing system. An example of such a computer system 900 is shown in FIG. 9. The computer system 900 includes one or more processors, such as processor 904. The processor 904 is connected to a communication infrastructure 906, such as a bus or network. After reading this description, it will become apparent to a person skilled in the relevant art how to implement the invention using other computer systems and/or computer architectures.

Computer system 900 also includes a main memory 908, preferably random access memory (RAM), and may also include a secondary memory 910. The secondary memory 910 may include, for example, a hard disk drive 912 and/or a removable storage drive 914. The removable storage drive 914 reads from and/or writes to a removable storage unit 918 in a well known manner. Removable storage unit 918 represents a floppy disk, magnetic tape, optical disk, or other storage medium which is read by and written to by removable storage drive 914. The removable storage unit 918 includes a computer usable storage medium having stored therein computer software and/or data.

In alternative implementations, secondary memory 910 may include other means for allowing computer programs or other instructions to be loaded into computer system 900. Such means may include, for example, a removable storage unit 922 and an interface 920. Examples of such means may include a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCM-CIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path (i.e., channel) 926. This channel 926 carries signals 928 and may be implemented using wire or cable, fiber optics, a phone line, a cellular phone link, an RF link and other communications channels. In an embodiment of the invention, signals 928 comprise performance reports 730a through 730n, received for processing by performance monitor 720. Information representing graphics data 810a through 810n can also be sent in the form of signals 928 from processor 904 to rendering pipelines 520a through 520n.

In this document, the terms "computer program medium" and "computer usable medium" are used to generally refer to media such as removable storage units 918 and 922, a hard disk installed in hard disk drive 912, and signals 928. These computer program products are means for providing software to computer system 900.

Computer programs (also called computer control logic) are stored in main memory 908 and/or secondary memory 910. Computer programs may also be received via communications interface 924. Such computer programs, when executed, enable the computer system 900 to implement the present invention as discussed herein. In particular, the computer programs, when executed, enable the processor 904 to implement the present invention. Accordingly, such computer programs represent controllers of the computer system 900. Where the invention is implemented using software, the software may be stored in a computer program product and loaded into computer system 900 using removable storage drive 914, hard drive 912 or communications interface 924.

III. Method

Figure 10:
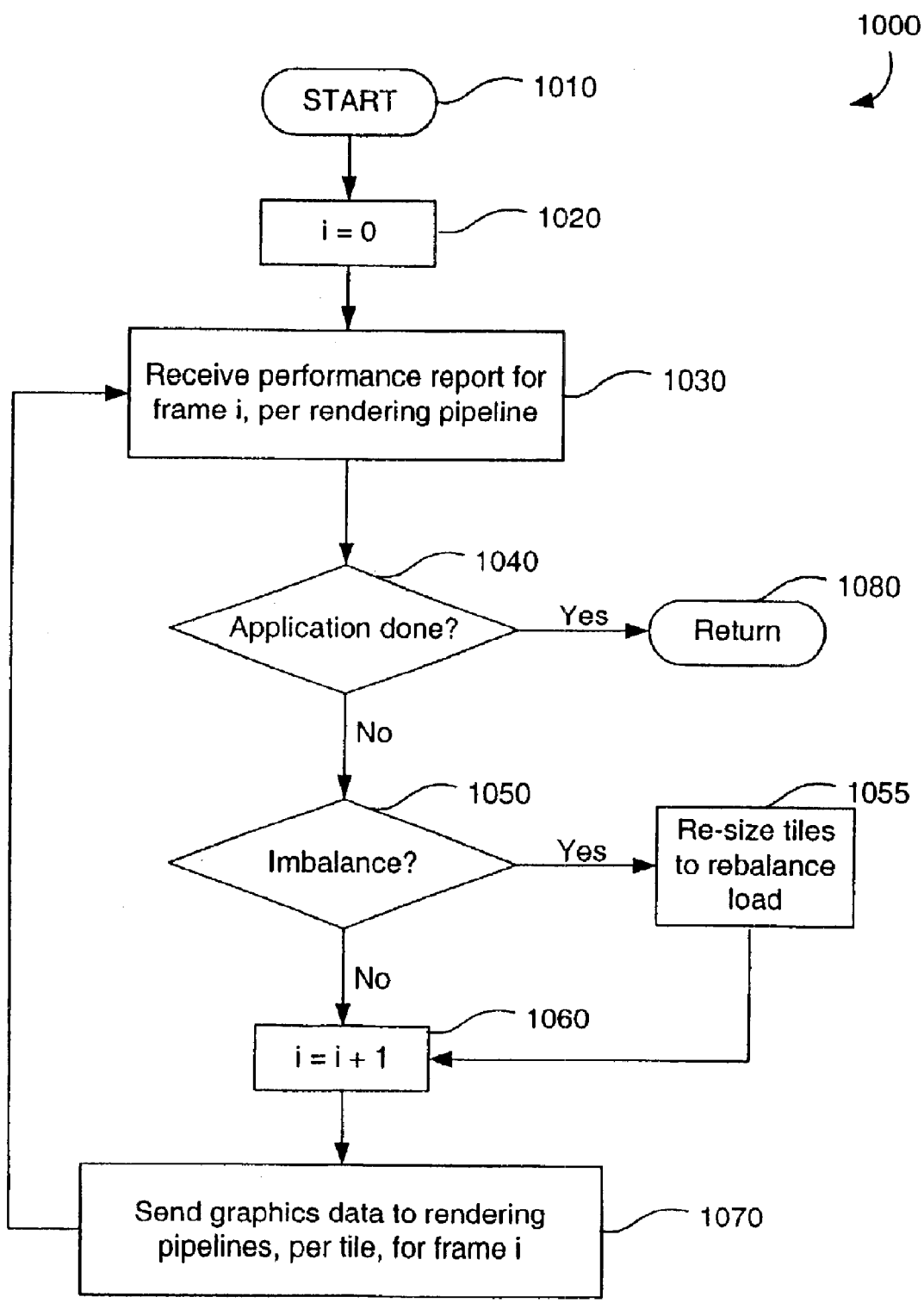
FIG. 10 is a flowchart illustrating the processing of an embodiment of the invention when the tiles of a frame are arranged in a single row or column.

The method of the invention according to one embodiment is illustrated in FIG. 10. This embodiment addresses processing when the tiles of a frame are configured in a single row or a single column (i.e., 1 x n or n x 1). The process begins at step 1010. In step 1020, an index value i is initialized to zero. In step 1030, a performance monitor receives a performance report for frame i, for each rendering pipeline. In step 1040, a determination is made as to whether the application has completed running. If so, the process concludes in step 1080. If the application is not yet finished, the process continues at step 1050. Here a determination is made as to whether an imbalance exists among the rendering pipelines as to the amount of time that was required to render their respective tiles in the current frame. This determination is illustrated in greater detail below.

If an imbalance is detected, then the process continues at step 1055. Here, the tiles are resized so as to rebalance the load among rendering pipelines for purposes of rendering the subsequent frame. For example, if the tiles of a frame are arrayed as a single row, and the imbalance exists between two rendering pipelines that correspond to adjacent tiles, the resizing can be expressed numerically as follows:

pixelshift=0.5*(maxtime−mintime)*(width of maxtile)/maxtime.

This equation describes the amount by which the vertical boundary between the two adjacent tiles needs to be shifted. Maxtime refers to the amount of time required by the rendering pipeline that took the longest to render its tile. Similarly, mintime refers to the time required by the rendering pipeline that took the shortest time to render its tile. Width of maxtile is the width of the tile that took the longest to render.

Note that if the tiles corresponding to maxtime and mintime are not immediately adjacent, then the intervening tile or tiles maintain their current width and are repositioned in the direction of the reduced tile. Also, if the tiles are arranged in a single column instead of a single row, then the boundaries between tiles are horizontal, and the shift of boundaries is vertical. Hence, width of maxtile above is replaced by the height of maxtile. These variations are described in greater detail below.

In step 1060, the index i is incremented by one in order to process the subsequent frame. In step 1070, graphics data is sent by the allocation module to the rendering pipelines. Allocation of graphics data is done on a per tile basis. All graphics data associated with a particular tile is sent to a particular rendering pipeline. If necessary, the tiles will have been resized according to the process described with respect to step 1055 above. Processing returns to step 1030 once rendering of the subsequent frame is completed.

Figure 11:
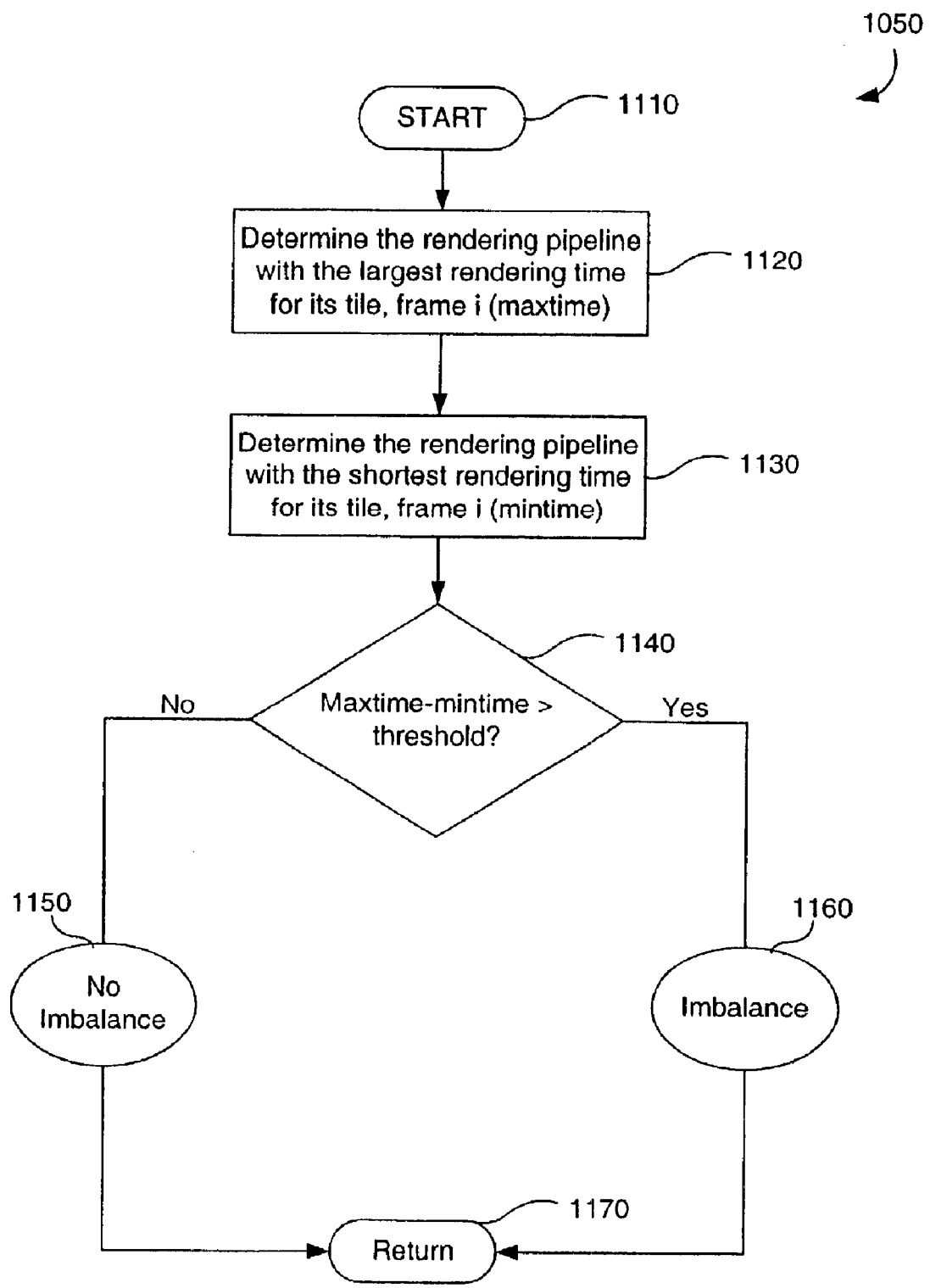
FIG. 11 is a flowchart illustrating in greater detail the determination of whether or not an imbalance exists across a set of rendering pipelines, according to an embodiment of the invention.

Step 1050 above, the determination of whether or not an imbalance exists among rendering pipelines, is illustrated in greater detail in FIG. 11. The process starts at step 1110. In step 1120, the maxtime rendering pipeline is determined, i.e., the pipeline with the longest rendering time for its tile in the current frame. In step 1130, the mintime rendering pipeline is determined, i.e., the pipeline with the shortest rendering time for its tile in the current frame. In step 1140, a determination is made as to whether the difference between maxtime and mintime exceeds the threshold value. If so, then an imbalance is detected (condition 1160); if not, then no imbalance is detected (condition 1150). The process is concluded at step 1170.

In an embodiment of the invention, the threshold is defined to be a fixed percentage of maxtime. For example, the threshold can be defined to be 10% of maxtime. In this case, if the difference between maxtime and mintime exceeds 10% of maxtime, then an imbalance is detected. Depending on the size of the dataset being rendered, a different percentage may be appropriate. For some datasets, 10% may be appropriate. However, 1 or 2% may be more appropriate for a larger dataset since, for a large dataset, 1 or 2% of maxtime can be a significant disparity.

Figure 12A:
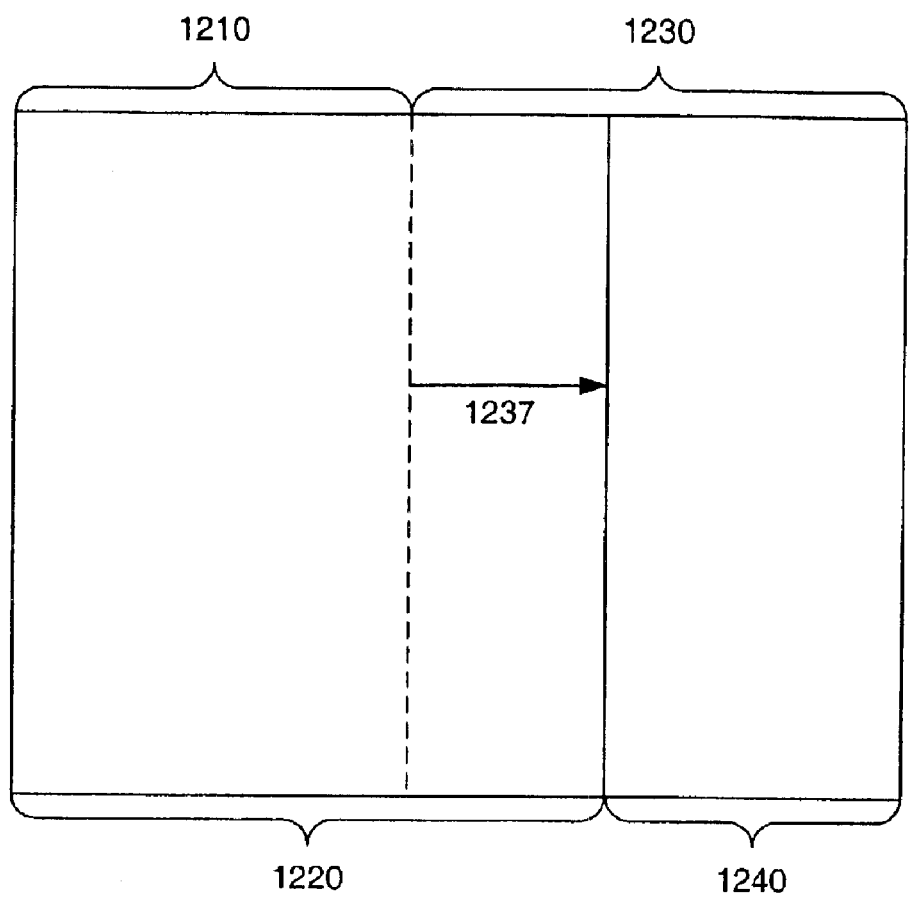
FIGS. 12A and 12B illustrate the resizing of tiles, wherein a given frame is composed of two tiles.
Figure 12B:
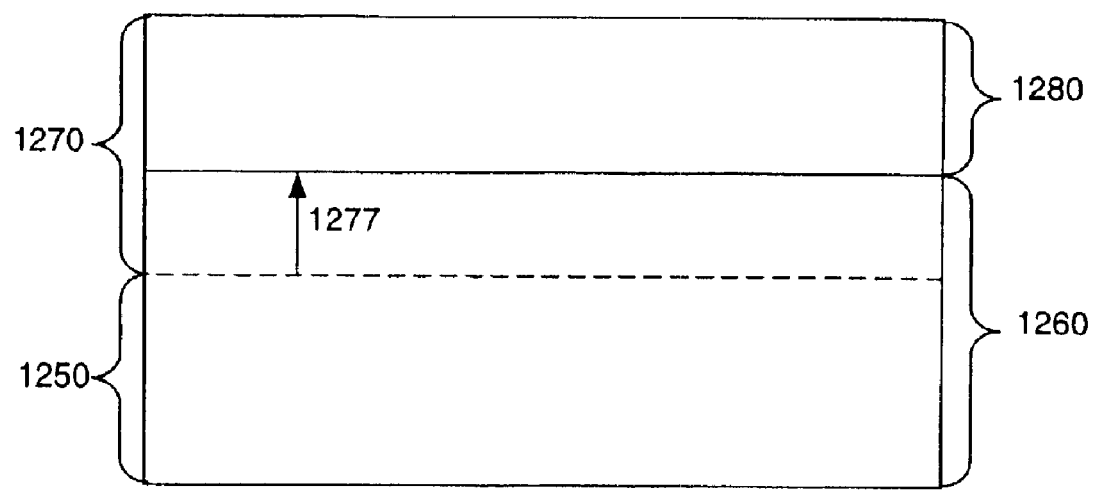

The resizing of tiles, described above with respect to step 1055, is illustrated in FIGS. 12A and 12B. The frame of FIG. 12A is composed of two tiles. Their widths in the current frame are labelled 1210 and 1230. In this example, an imbalance has been detected in the time required by the respective rendering pipelines, such that the tile having width 1230 has taken significantly longer to render than the tile having width 1210. As a result, the boundary between the two tiles is shifted by distance 1237. Hence, for the next frame, the tiles have widths of 1220 and 1240 respectively. This resizing alters the amount of graphics data that must be rendered by each rendering pipeline, so that the respective workloads are more balanced for the next frame.

FIG. 12B shows a frame consisting of two tiles arranged vertically. In the current frame, the tiles have heights 1250 and 1270. A determination is then made that a significant imbalance exists in the rendering times for the two tiles. In particular, the tile having width 1270 has taken significantly longer to render than the tile having width 1250. As a result, the boundary between the two tiles is shifted upward by a distance 1277. In the next frame, therefore, one tile has a height 1280, while the other has a height 1260. Hence, for the next frame, one rendering pipeline now has a smaller tile to render, while the other rendering pipeline has a larger tile to render compared to the previous frame. The respective workloads are now more balanced for the next frame.

Figure 13A:
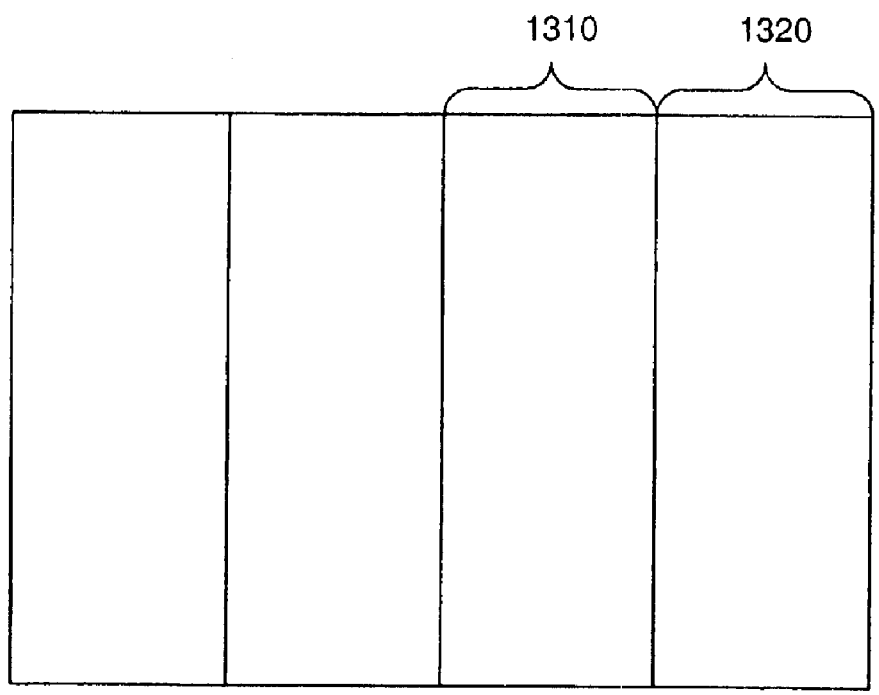
FIGS. 13A and 13B illustrate the resizing of tiles, wherein the frame consists of a single row of four tiles.
Figure 13B:
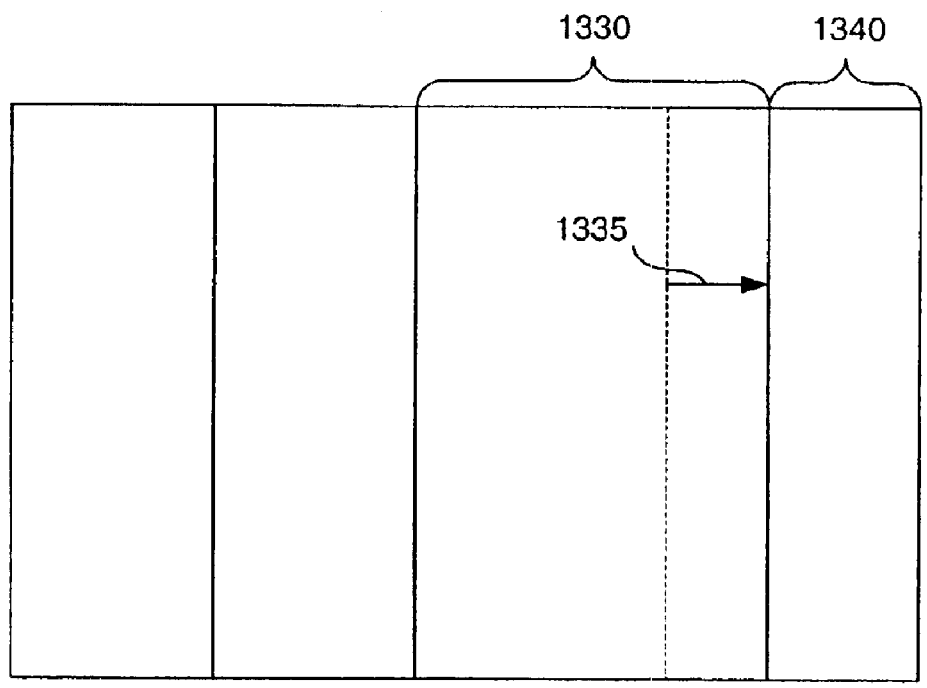

FIGS. 13A and 13B illustrate a frame composed of four tiles arranged as a single row. In the current frame, shown in FIG. 13A, two adjacent frames have widths 1310 and 1320. A determination is then made that, of the four rendering pipelines, the rendering pipeline associated with the tile having width 1310 required the shortest amount of time to render its tile (mintime), while the rendering pipeline associated with the tile having width 1320 took the longest to render its tile (maxtime). Moreover, it is determined that the difference in these two rendering times is so significant as to be an imbalance. Hence, as shown in FIG. 13B, the tile that required the shortest amount of time to render is increased in width by a distance 1335. The tile that had taken the longest amount of time to render is shrunk by a corresponding amount. In the next frame, therefore, these two tiles have widths 1330 and 1340 respectively, and their associated rendering pipelines have accordingly altered workloads. The other two tiles remain unchanged in width.

Figure 14A:
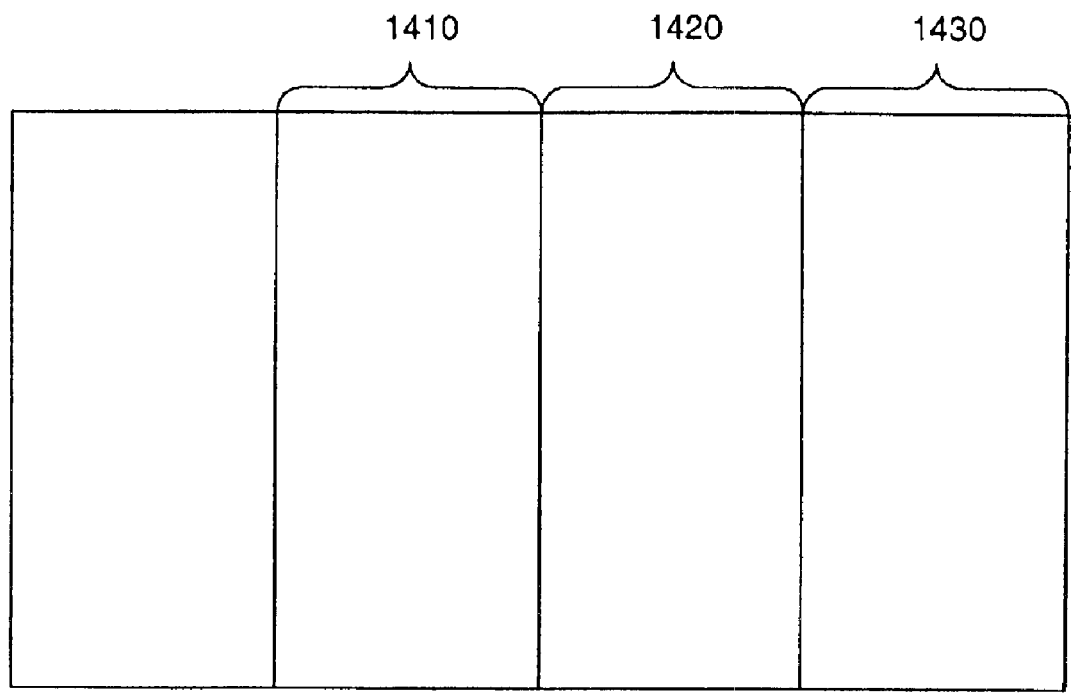
FIGS. 14A and 14B represent the resizing of tiles, wherein the frame consists of a row of four tiles and wherein the tile that is increasing in size is not adjacent to the tile that is decreasing in size.
Figure 14B:
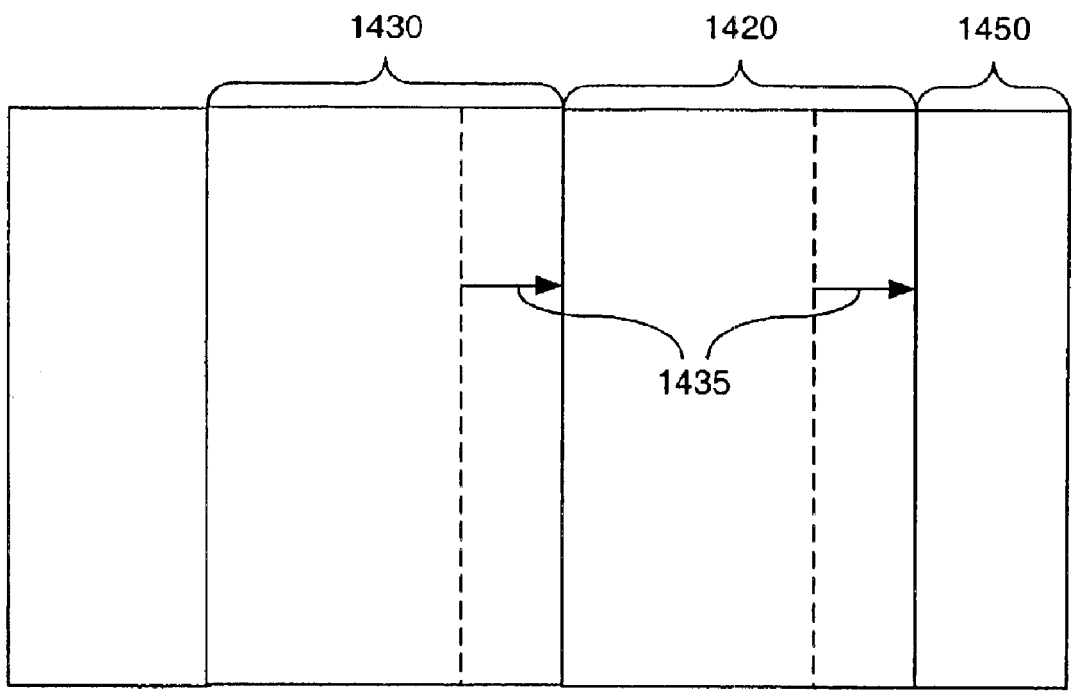

FIGS. 14A and 14B represent the situation where an imbalance has been detected, but the tile that required the longest amount of time to render and the tile requiring the shortest amount of time to render are separated by one or more intervening tiles. In FIG. 14A, the tile having width 1410 is determined to have taken the shortest amount of time to render, while the tile having width 1430 is determined to have taken the longest amount of time to render. As a result, the tile boundaries shift as shown in FIG. 14B. In particular, the right boundary of the frame that took the shortest amount of time to render is shifted to the right by a distance 1435. Also, the left boundary of the frame that required the longest amount of time to render is shifted to the right by the same distance. Hence, for purposes of the next frame, these two tiles have widths 1430 and 1450 respectively. Note, that the intervening tile having width 1420 has been repositioned to the right, but retains its original width. Hence, this tile has been repositioned but not resized.

Figure 15:
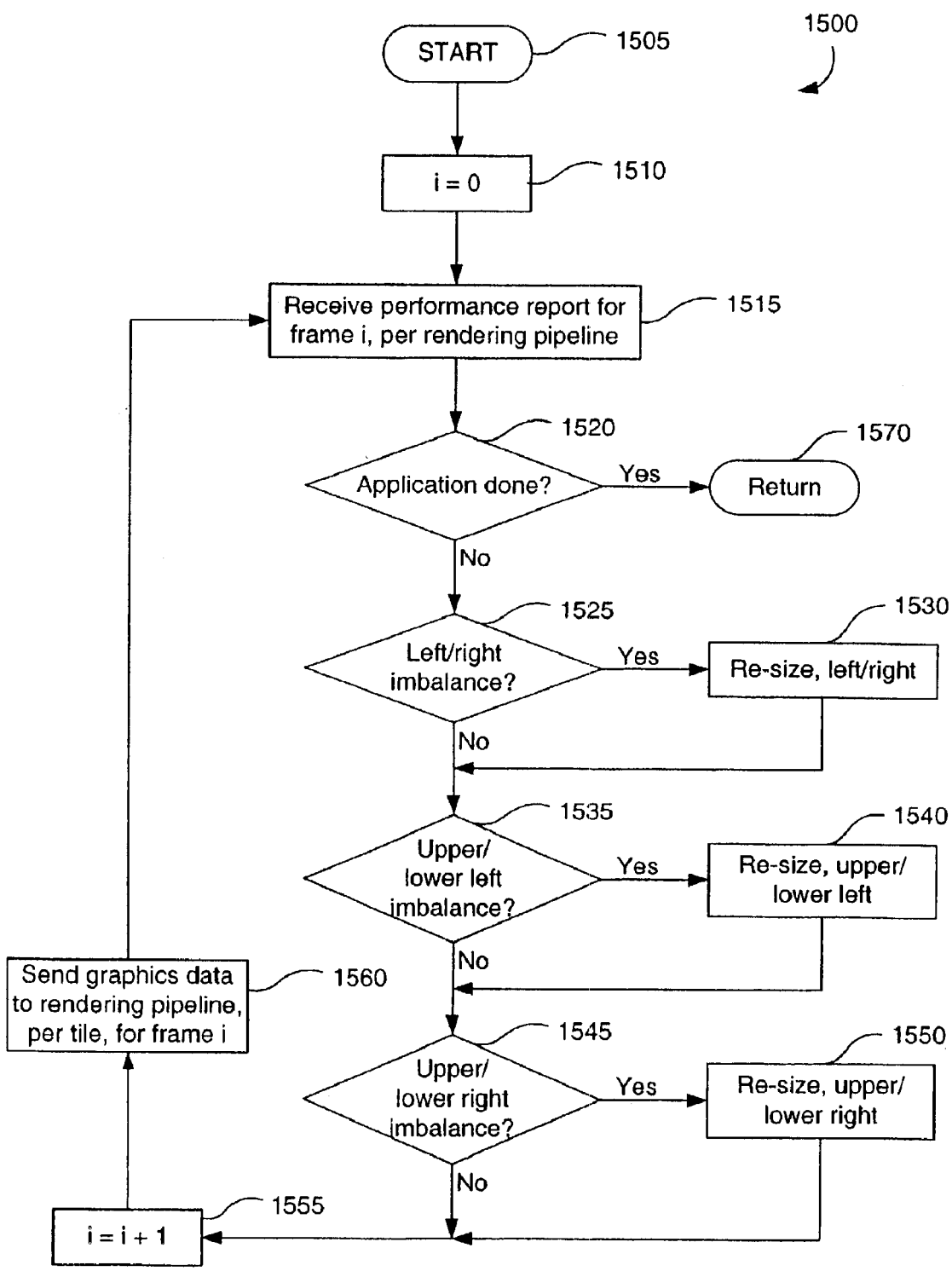
FIG. 15 is a flowchart illustrating the processing of an embodiment of the invention, wherein the frame is composed of four tiles, arranged in two columns and two rows.

Another embodiment of the process of the invention is illustrated in FIG. 15. This embodiment addresses the situation where a frame is divided into four tiles, two rows by two columns. The process begins with step 1505. In step 1510, an index value is initialized to zero. In step 1515, the performance monitor receives a performance report for the current frame from each rendering pipeline. In step 1520, a determination is made as to whether the application has finished running. If so, the process concludes at step 1570. Otherwise, the process continues at step 1525. Here, a determination is made as to whether an imbalance exists as to rendering of the two half frames (i.e., the two left tiles, taken collectively, in comparison to the two right tiles, taken collectively). This determination is described in greater detail below.

If such an imbalance exists, then processing continues at step 1530. Here, the vertical boundary is shifted, either left or right, thereby resizing all four tiles. The magnitude of this shift is determined according to the process of step 1055 of FIG. 10. In this case, the left and right half frames are treated as single tiles. The time for rendering the left half tile is the sum of the rendering times for the upper and lower left tiles. The time for rendering the right half frame is calculated similarly. The above equation for the pixelshift is then applied to determine the extent of the boundary shift.

In step 1535, a decision is made as to whether an imbalance exists between the upper and lower tiles of the left half. If so, processing continues at step 1540. Here, the upper left (UL) and lower left (LL) tiles are resized. In step 1545, a determination is made as to whether an imbalance exists between rendering of the upper and lower right tiles UR and LR. If so, then resizing of the upper right and lower right tiles is performed in step 1550. The resizing operations of steps 1540 and 1550 are performed according to the above equation for pixelshift, where the width of maxtile is replaced by the height of maxtile.

In step 1555, the index value is incremented by one so that the next frame can be rendered. In step 1560, graphics data for the next frame is sent to each rendering pipeline. The graphics data sent to a given rendering pipeline depends on its potentially re-sized tile. The processing then returns to step 1515.

Figure 16:
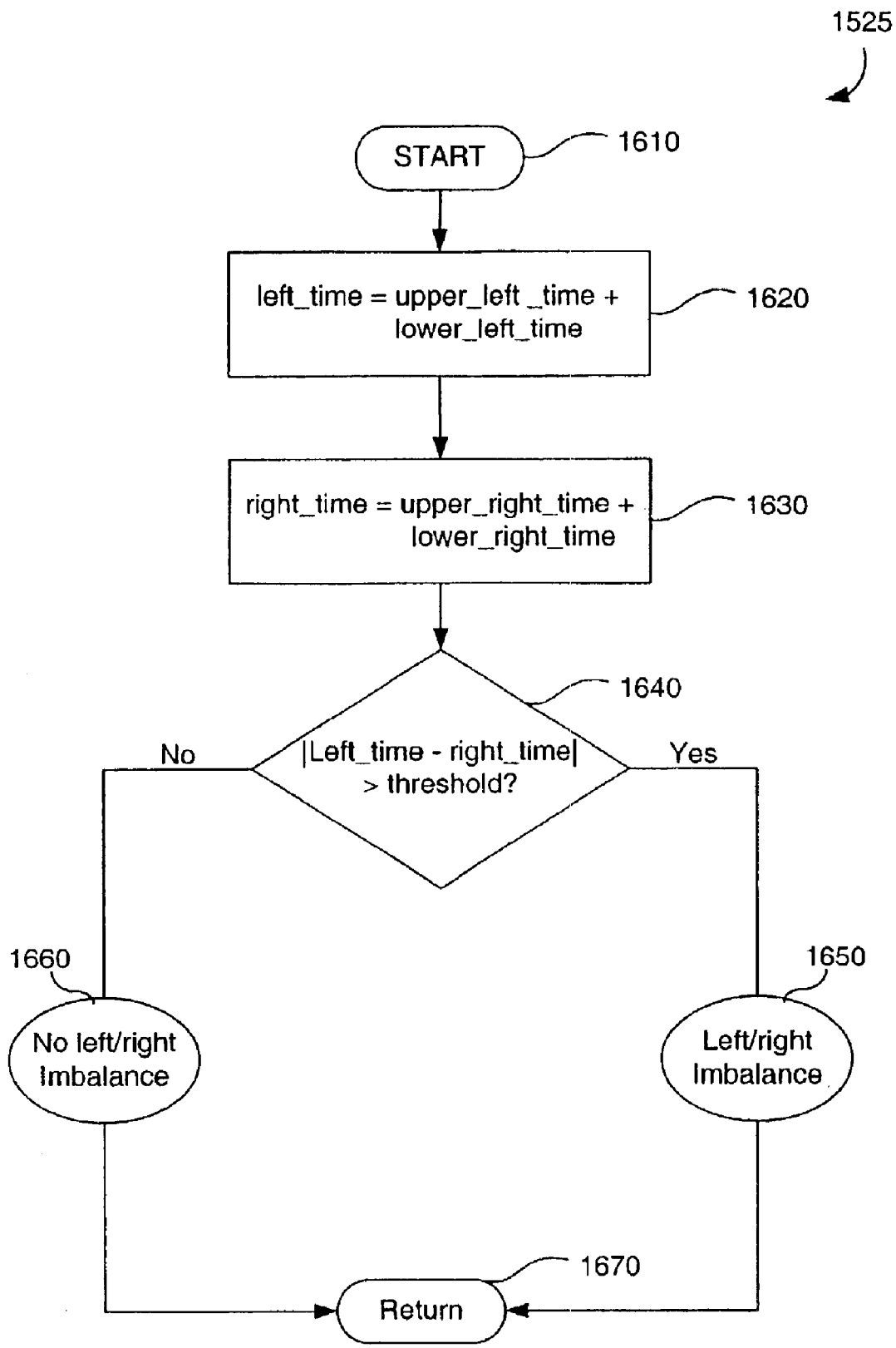
FIG. 16 is a flowchart illustrating the determination of whether an imbalance exists with respect to tiles on the left and tiles on the right in a frame composed of four tiles in a 2×2 arrangement, according to an embodiment of the invention.

Step 1525 above, the step of determining whether an imbalance exists between the left and right half frames, is illustrated in greater detail in FIG. 16. The process begins with step 1610. In step 1620, the total rendering time required for the left tiles is determined by summing the time required to render the upper left (UL) tile (upper$_{13}$left$_{13}$time) and the time required to render the lower left(LL) tile (lower$_{13}$left$_{13}$time). For convenience, the total is referred to as left$_{13}$time.

In step 1630, the analogous operation is performed with respect to the right tiles, upper right UR and lower right LR. The total rendering time required for the right tiles is determined by summing the time required to render the upper right (UR) tile (upper$_{13}$right$_{13}$time) and the time required to render the lower right (LR) tile (lower$_{13}$right$_{13}$time). For convenience, the total is referred to as right$_{13}$time In step 1640, a determination is made as to whether the magnitude of the difference between left$_{13}$time and right$_{13}$time exceeds a threshold value. If so, an imbalance is detected between left and right half frames (state 1650). If not, then no significant imbalance is detected (state 1660). The process concludes at step 1670.

Figure 17A:
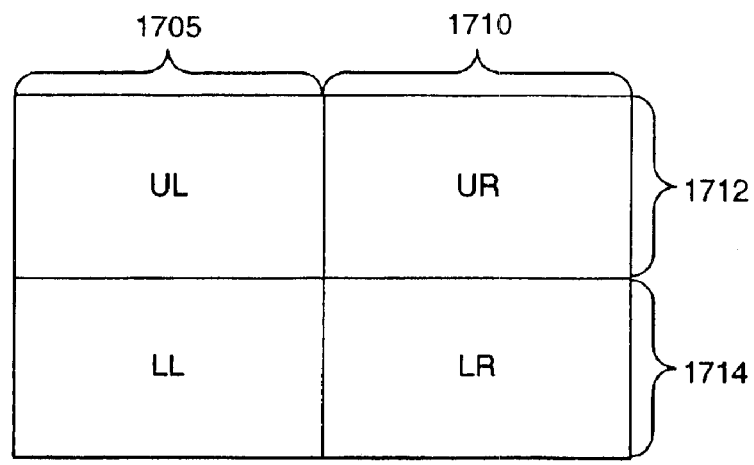
FIGS. 17A through 17C represent the resizing of tiles in a frame in which tiles are initially configured in a 2×2 arrangement.
Figure 17B:
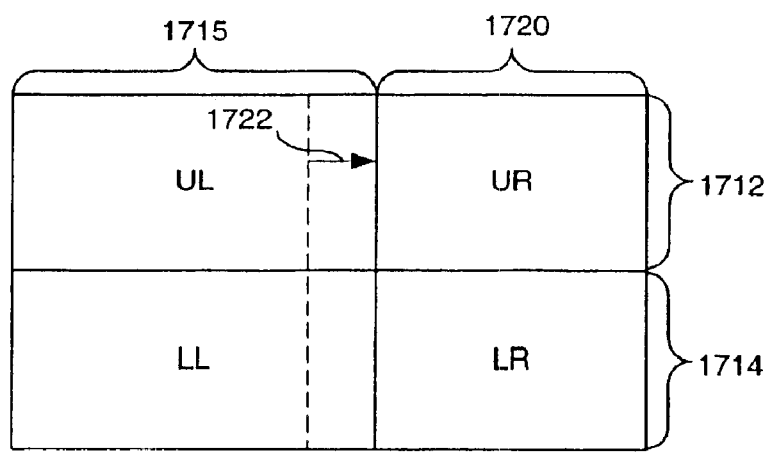
Figure 17C:
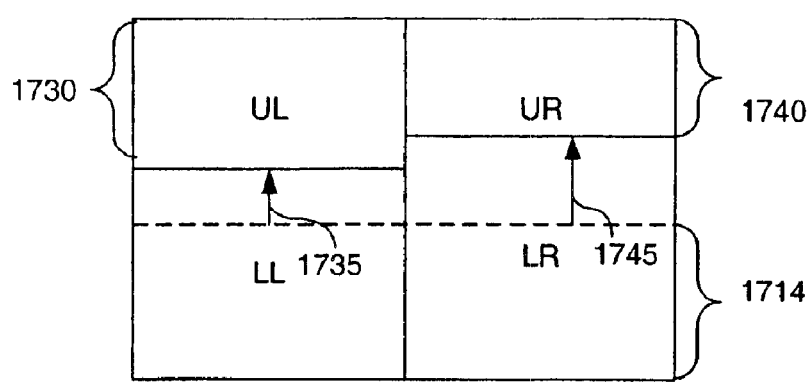

The results of the processing of FIG. 15 are illustrated in FIGS. 17A-17C. FIG. 17A illustrates a frame composed of a 2×2 array of tiles. The width of the left half frame is shown as width 1705. The width of the right half frame is shown as width 1710. The height of the upper tiles is shown as height 1712, and the height of the lower tiles is shown as height 1714. In FIG. 17B, a determination has been made that right time exceeds left time by a significant margin. As a result, the vertical boundary is shifted to the right by a distance of 1722. As a result, the left half frame now has a width of 1715, while the right half frame has width 1720. At this point, the heights of the upper and lower tiles are unchanged. In FIG. 17C, the left and right sides of the frame are considered independently. With respect to the left side, a determination is made that tile UL took significantly longer to render than tile LL in the current frame. Consequently, the horizontal boundary on the left side is raised, thereby increasing the height of the tile LL by a distance 1735. As a result, tile UL now has a height 1730. On the right side, a determination is made that tile UR took significantly longer to render than the tile LR in the current frame. As a result, the horizontal boundary on the right side is raised by a distance 1745. The height of tile UR, for purposes of the next frame, is now 1740.

In an alternative embodiment of the method of the invention, a 2×2 frame can first be processed as upper and lower half frames. In such an embodiment, a determination is made as to whether either upper or lower half frame takes significantly longer to render than the other. For either half frame, the time required to render the half frame is the sum of the rendering times for its left and right tiles. If either upper or lower half frame takes significantly longer to render than the other, the horizontal boundary is shifted by an amount determined by the above pixelshift equation for purposes of the next frame. The left and right tiles of each of these half frames can then be considered. For each half frame, a determination is made as to whether the left or right tile has taken significantly longer to render than the other. If so, the vertical boundary for that half frame is shifted according to the above pixelshift equation for purposes of the next frame.

The above methods can be applied to a tiling scheme other than the 2×2, 1×n, and n×1 cases described above, provided that the tiling scheme can be decomposed into such cases. For example, a tiling scheme having two rows of eight tiles can be decomposed into two half tiles, each 1×8. The horizontal boundary can first be shifted if the difference in rendering times between the two half tiles is significant, as described above with respect to FIGS. 10, 11, and 12B. Within each half frame, re-sizing can be performed as described above with respect to FIGS. 10, 11, and 13B or 14B.

Figure 18:
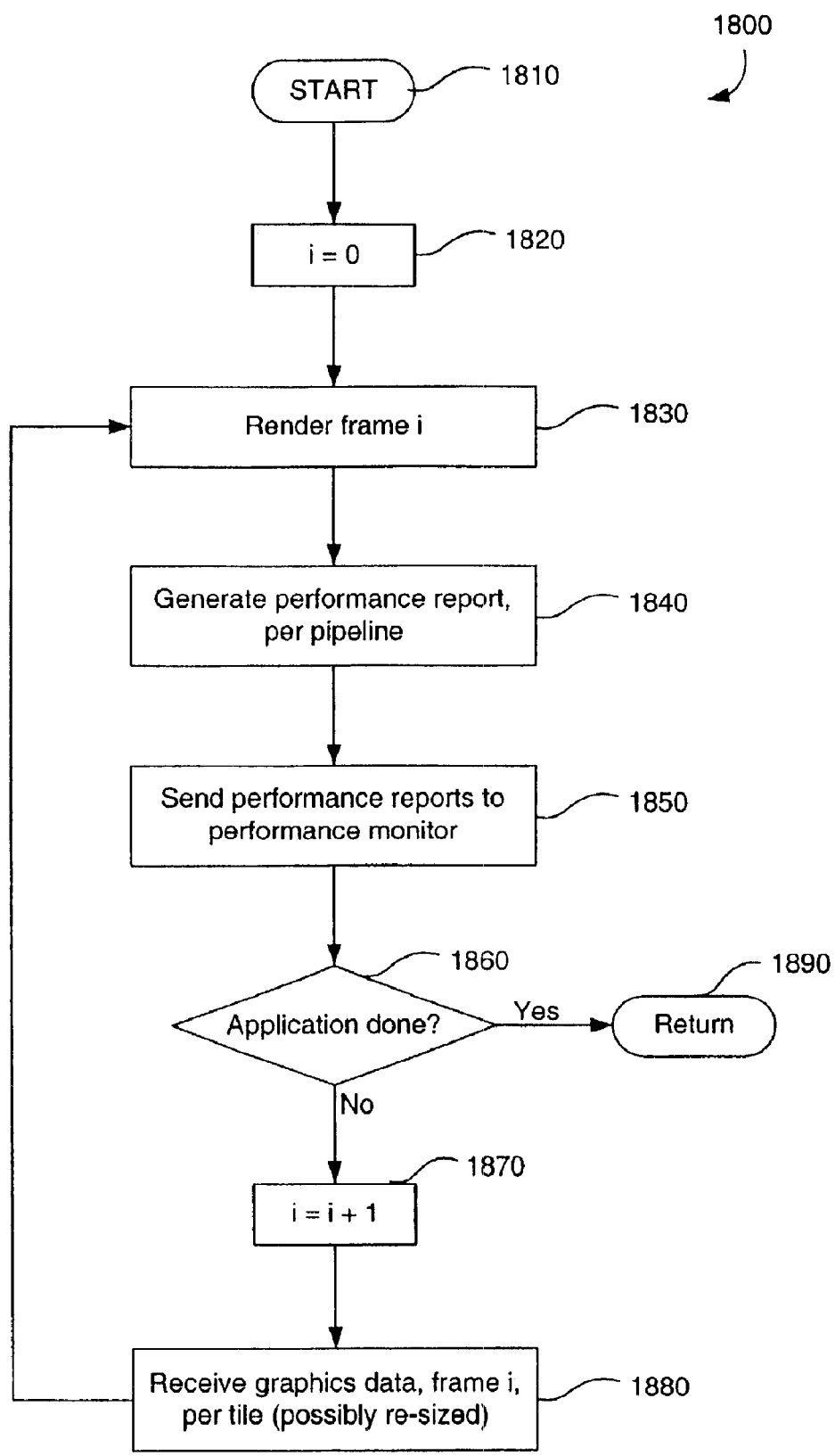
FIG. 18 is a flowchart illustrating the processing of an embodiment of the invention from the perspective of a rendering pipeline.

The processing of the invention from the perspective of the rendering pipelines is illustrated in FIG. 18. The process begins at step 1810. In step 1820, an index value is initialized to zero. In step 1830, frame i is rendered. In step 1840, each rendering pipeline generates a performance report stating the length of time required to render its respective tile in the current frame. In step 1850, the performance reports are sent to the performance monitor. In step 1860, the determination is made as to whether the application has completed running. If so, the process concludes at step 1890. Otherwise, the process continues at step 1870 where the index value is incremented by 1. In step 1880, after any imbalances have been identified and any tile resizing has been performed, the rendering pipelines receive graphics data for the next frame. As in previous frames, each rendering pipeline receives the graphics data associated with a particular tile. The process then continues at step 1830, wherein the next frame is rendered.

What is claimed is:

1. A system for generating a sequence of computer graphics frames, the system comprising:
    a plurality of rendering pipelines that each receive a distinct subset of graphics data for a respective current frame in the sequence of frames, render said distinct subset of graphics data, and produce a performance report regarding the workload incurred by each respective rendering pipeline during said rendering;
    a performance monitor that receives said performance report from each rendering pipeline and determines whether a disparity in the workloads of the respective rendering pipelines exceeds a threshold to thereby identify a load imbalance; and
    an allocation module that reallocates graphics data for a next frame to said rendering pipelines, wherein reallocation depends on said load imbalance and seeks to reduce any subsequent load imbalance associated with rendering said next frame.

2. The system of claim 1, further comprising a graphics application, wherein said graphics application comprises said performance monitor.

3. The system of claim 2, wherein said graphics application further comprises said allocation module.

4. The system of claim 1, further comprising a compositor that receives rendered graphics data from each said rendering pipeline and composits said rendered graphics data to form each of said frames.

5. The system of claim 1, wherein each said distinct subset of graphics data corresponds to one of a plurality of tiles of said current frame.

6. The system of claim 5, wherein said allocation module reallocates graphics data to said rendering pipelines for said next frame by resizing tiles of said next frame relative to said tiles of said current framer.

7. A method of rendering successive frames using a plurality of rendering pipelines, the method comprising the steps of:
    (a) rendering a current frame, wherein each rendering pipeline renders a tile of the current frame;
    (b) generating a performance report for each rendering pipeline, each performance report indicating the workload incurred by the respective rendering pipeline during said rendering;
    (c) sending the performance reports to a performance monitor; and
    (d) at each rendering pipeline, receiving graphics data associated with a tile of a next frame, wherein a plurality of the tiles of the next frame have been resized relative to the corresponding tiles of the current frame if the difference between the performance reports are above a threshold.

8. A method of controlling the rendering of successive frames, wherein the rendering is performed using a plurality of rendering pipelines, the method comprising the steps of:
    (a) receiving a performance report for each rendering pipeline, each performance report indicating the workload incurred by the respective rendering pipeline during rendering of a current frame;
    (b) determining whether the performance reports indicate a significant load imbalance among the rendering pipelines, wherein said significant load imbalance indicates that the difference between the performance reports is above a threshold;
    (c) if a significant load balance is indicated, resizing at least one tile of the next frame relative to a corresponding tile of the current frame; and
    (d) sending graphics data associated with the next frame to the rendering pipelines, wherein the graphics data sent to a given rendering pipeline is associated with a tile of the next frame.

9. The method of claim 8, wherein said step b) comprises the steps of:
    (i) determining the rendering pipeline with the longest rendering time for its tile in the current frame;
    (ii) determining the rendering pipeline with the shortest rendering time for its tile in the current frame; and
    (iii) determining if the difference between the longest and shortest rendering times exceeds a threshold value, thereby indicating a significant load imbalance.

10. The method of claim 9, wherein the threshold value is a percentage of the longest rendering time.

11. The method of claim 9, wherein said step c) comprises the steps of:
    (i) with respect to the next frame, increasing the size of the tile corresponding to the rendering pipeline with the shortest rendering time, by an amount proportional to the difference between the longest and shortest rendering times; and
    (ii) with respect to the next frame, decreasing the size of the tile corresponding to the rendering pipeline with the longest rendering time by the same amount.

12. The method of claim 8, wherein a subset of tiles in the current frame constitutes a first half frame, and the remaining tiles in the current frame constitute a second half frame wherein said step b) comprises:
    (i) summing the rendering times for all tiles in the first half frame of the current frame;
    (ii) summing the rendering times for all tiles in the second half frame of the current frame;
    (iii) determining if the difference between the two sums exceeds a threshold value, thereby indicating a significant load imbalance.

13. The method of claim 12, wherein said step c) comprises:
    (i) with respect to the next frame, increasing the size of at least one tile of the half frame having the lesser sum; and
    (ii) with respect to the next frame, decreasing the size of at least one tile of the half frame having the greater sum,
    wherein the size of the half frame having the lesser sum is increased by an amount proportional to the difference between the two sums and the size of the frame half having the greater sum is decreased by the same amount.

14. The method of claim 13, wherein said step c) further comprises the steps of:
    (iii) determining the rendering pipeline with the longest rendering time for its tile in the first half frame of the current frame;

(iv) determining the rendering pipeline with the shortest rendering time for its tile in the first half frame of the current frame;

(v) determining the difference between the longest and shortest rendering times in the first half frame of the current frame;

(vi) determining if the difference between the longest and shortest rendering times in the first half frame of the current frame exceeds the threshold value; and (vii) if the difference exceeds the threshold value, with respect to the next frame, increasing the size of the tile corresponding to the rendering pipeline with the shortest rendering time in the first half frame of the current frame, by an amount proportional to the difference between the longest and shortest rendering times in the first half frame of the current frame and, with respect to the next frame, decreasing the size of the tile corresponding to the rendering pipeline with the longest rendering time in the first half frame of the current frame, by the same amount.

15. The method of claim 13, wherein said step c) further comprises the steps of:

(iii) determining the rendering pipeline with the longest rendering time for its tile in the second half frame of the current frame;

(iv) determining the rendering pipeline with the shortest rendering time for its tile in the second half frame of the current frame;

(v) determining the difference between the longest and shortest rendering times in the second half frame of the current frame;

(vi) determining if the difference between the longest and shortest rendering times in the second half frame of the current frame exceeds the threshold value; and (vii) if the difference exceeds the threshold value, with respect to the next frame, increasing the size of the tile corresponding to the rendering pipeline with the shortest rendering time in the second half frame of the current frame by an amount proportional to the difference between the longest and shortest rendering times in the second half frame of the current frame, and with respect to the next frame, decreasing the size of the tile corresponding to the rendering pipeline with the longest rendering time in the second half frame of the current frame, by the same amount.

16. A computer program product comprising a computer useable medium having control logic stored therein for causing a computer to render successive frames using a plurality of rendering pipelines, the computer control logic comprising:

a first computer readable program code means for causing the computer to render a current frame, wherein each rendering pipeline renders a tile of the current frame;

a second computer readable program code means for causing the computer to generate a performance report for each rendering pipeline, each performance report indicating the workload incurred by the respective rendering pipeline during said rendering;

a third computer readable program code means for causing the computer to send the performance reports to a performance monitor; and a fourth computer readable program code means for causing the computer to allow receipt of graphics data at each rendering pipeline, wherein graphics data received at each rendering pipeline is associated with a tile of a next frame, and wherein a plurality of the tiles of the next frame have been resized relative to the corresponding tiles of the current frame if the difference between the performance reports are above a threshold.

17. A computer program product comprising a computer useable medium having control logic stored therein for causing a computer to control the rendering of successive frames, wherein the rendering is performed using a plurality of rendering pipelines, the computer control logic comprising:

a first computer readable program code means for causing the computer to receive a performance report for each rendering pipeline, each performance report indicating the workload incurred by the respective rendering pipeline during rendering of a current frame;

a second computer readable program code means for causing the computer to determine whether the performance reports indicate a significant load imbalance among the rendering pipelines, wherein the significant load imbalance indicates that the difference between the performance reports is above a threshold;

a third computer readable program code means for causing the computer to rebalance the workload to be incurred by the rendering pipelines during rendering of a next frame, if a significant load balance is indicated, by resizing at least one tile of the next frame relative to a corresponding tile of the current frame; and a fourth computer readable program code means for causing the computer to send graphics data associated with the next frame to the rendering pipelines, wherein the graphics data sent to a given rendering pipeline is associated with a tile of the next frame.

18. The computer program product of claim 17, wherein said second computer readable program code means comprises:

(i) computer readable program code means for causing the computer to determine the rendering pipeline with the longest rendering time for its tile in the current frame;

(ii) computer readable program code means for causing the computer to determine the rendering pipeline with the shortest rendering time for its tile in the current frame; and (iii) computer readable program code means for causing the computer to determine if the difference between the longest and shortest rendering times exceeds a threshold value, thereby indicating a significant load imbalance.

19. The computer program product of claim 17, wherein the threshold value is a percentage of the longest rendering time.

20. The computer program product of claim 17, wherein said third computer readable program code means comprises:

(i) computer readable program code means for causing the computer to increase the size of the tile corresponding to the rendering pipeline with the shortest rendering time, by an amount proportional to the difference between the longest and shortest rendering times, for purposes of the next frame;

(ii) computer readable program code means for causing the computer to decrease the size of the tile corresponding to the rendering pipeline with the longest rendering time by the same amount, for purposes of the next frame.

21. A method of controlling the rendering of successive frames, wherein the rendering is performed using a plurality of rendering pipelines, the method comprising the steps of:
(a) receiving a performance report for each rendering pipeline, each performance report indicating the workload incurred by the respective rendering pipeline during rendering of a current frame;
(b) determining whether the performance reports indicate a significant load imbalance among the rendering pipelines, wherein said step b) comprises:
  (i) determining the rendering pipeline with the longest rendering time for its tile in the current frame;
  (ii) determining the rendering pipeline with the shortest rendering time for its tile in the current frame; and
  (iii) determining if the difference between the longest and shortest rendering times exceeds a threshold value, thereby indicating a significant load imbalance;
(c) if a significant load balance is indicated, resizing at least one tile of the next frame relative to a corresponding tile of the current frame; and
(d) sending graphics data associated with the next frame to the rendering pipelines, wherein the graphics data sent to a given rendering pipeline is associated with a tile of the next frame.

22. The method of claim 21, wherein the threshold value is a percentage of the longest rendering time.

23. The method of claim 21, wherein said step c) comprises the steps of:
  (i) with respect to the next frame, increasing the size of the tile corresponding to the rendering pipeline with the shortest rendering time, by an amount proportional to the difference between the longest and shortest rendering times; and
  (ii) with respect to the next frame, decreasing the size of the tile corresponding to the rendering pipeline with the longest rendering time by the same amount.

24. A method of controlling the rendering of successive frames, wherein the rendering is performed using a plurality of rendering pipelines, the method comprising the steps of:
(a) receiving a performance report for each rendering pipeline, each performance report indicating the workload incurred by the respective rendering pipeline during rendering of a current frame;
(b) determining whether the performance reports indicate a significant load imbalance among the rendering pipelines, wherein a subset of tiles in the current frame constitutes a first half frame, and the remaining tiles in the current frame constitute a second half frame wherein said step b) comprises:
  (i) summing the rendering times for all tiles in the first half frame of the current frame;
  (ii) summing the rendering times for all tiles in the second half frame of the current frame;
  (iii) determining if the difference between the two sums exceeds a threshold value, thereby indicating a significant load imbalance;
(c) if a significant load balance is indicated, resizing at least one tile of the next frame relative to a corresponding tile of the current frame; and
(d) sending graphics data associated with the next frame to the rendering pipelines, wherein the graphics data sent to a given rendering pipeline is associated with a tile of the next frame.

25. The method of claim 24, wherein said step c) comprises:
  (i) with respect to the next frame, increasing the size of at least one tile of the half frame having the lesser sum; and
  (ii) with respect to the next frame, decreasing the size of at least one tile of the half frame having the greater sum,
  wherein the size of the half frame having the lesser sum is increased by an amount proportional to the difference between the two sums and the size of the frame half having the greater sum is decreased by the same amount.

26. The method of claim 25, wherein said step c) further comprises the steps of:
  (iii) determining the rendering pipeline with the longest rendering time for its tile in the first half frame of the current frame;
  (iv) determining the rendering pipeline with the shortest rendering time for its tile in the first half frame of the current frame;
  (v) determining the difference between the longest and shortest rendering times in the first half frame of the current frame;
  (vi) determining if the difference between the longest and shortest rendering times in the first half frame of the current frame exceeds the threshold value; and
  (vii) if the difference exceeds the threshold value,
  with respect to the next frame, increasing the size of the tile corresponding to the rendering pipeline with the shortest rendering time in the first half frame of the current frame, by an amount proportional to the difference between the longest and shortest rendering times in the first half frame of the current frame and,
  with respect to the next frame, decreasing the size of the tile corresponding to the rendering pipeline with the longest rendering time in the first half frame of the current frame, by the same amount.

27. The method of claim 25, wherein said step c) further comprises the steps of:
  (iii) determining the rendering pipeline with the longest rendering time for its tile in the second half frame of the current frame;
  (iv) determining the rendering pipeline with the shortest rendering time for its tile in the second half frame of the current frame;
  (v) determining the difference between the longest and shortest rendering times in the second half frame of the current frame;
  (vi) determining if the difference between the longest and shortest rendering times in the second half frame of the current frame exceeds the threshold value; and
  (vii) if the difference exceeds the threshold value,
  with respect to the next frame, increasing the size of the tile corresponding to the rendering pipeline with the shortest rendering time in the second half frame of the current frame by an amount proportional to the difference between the longest and shortest rendering times in the second half frame of the current frame, and
  with respect to the next frame, decreasing the size of the tile corresponding to the rendering pipeline with the longest rendering time in the second half frame of the current frame, by the same amount.

28. A computer program product comprising a computer useable medium having control logic stored therein for causing a computer to control the rendering of successive frames, wherein the rendering is performed using a plurality of rendering pipelines, the computer control logic comprising:

a first computer readable program code means for causing the computer to receive a performance report for each rendering pipeline, each performance report indicating the workload incurred by the respective rendering pipeline during rendering of a current frame;

a second computer readable program code means for causing the computer to determine whether the performance reports indicate a significant load imbalance among the rendering pipelines, wherein said second computer readable program code means comprises:
        (i) computer readable program code means for causing the computer to determine the rendering pipeline with the longest rendering time for its tile in the current frame;
        (ii) computer readable program code means for causing the computer to determine the rendering pipeline with the shortest rendering time for its tile in the current frame; and
        (iii) computer readable program code means for causing the computer to determine if the difference between the longest and shortest rendering times exceeds a threshold value, thereby indicating a significant load imbalance;

a third computer readable program code means for causing the computer to rebalance the workload to be incurred by the rendering pipelines during rendering of a next frame, if a significant load balance is indicated, by resizing at least one tile of the next frame relative to a corresponding tile of the current frame; and a fourth computer readable program code means for causing the computer to send graphics data associated with the next frame to the rendering pipelines, wherein the graphics data sent to a given rendering pipeline is associated with a tile of the next frame.

29. A computer program product comprising a computer useable medium having control logic stored therein for causing a computer to control the rendering of successive frames, wherein the rendering is performed using a plurality of rendering pipelines, the computer control logic comprising:

a first computer readable program code means for causing the computer to receive a performance report for each rendering pipeline, each performance report indicating the workload incurred by the respective rendering pipeline during rendering of a current frame;

a second computer readable program code means for causing the computer to determine whether the performance reports indicate a significant load imbalance among the rendering pipelines;

a third computer readable program code means for causing the computer to rebalance the workload to be incurred by the rendering pipelines during rendering of a next frame, if a significant load balance is indicated, by resizing at least one tile of the next frame relative to a corresponding tile of the current frame, wherein said third computer readable program code means comprises:
        (i) computer readable program code means for causing the computer to increase the size of the tile corresponding to the rendering pipeline with the shortest rendering time, by an amount proportional to the difference between the longest arid shortest rendering times, for purposes of the next frame;
        (ii) computer readable program code means for causing the computer to decrease the size of the tile corresponding to the rendering pipeline with the longest rendering time by the same amount, for purposes of the next frame; and a fourth computer readable program code means for causing the computer to send graphics data associated with the next frame to the rendering pipelines, wherein the graphics data sent to a given rendering pipeline is associated with a tile of the next frame.

\* \* \* \* \*

UNITED STATES PATENT AND TRADEMARK OFFICE
CERTIFICATE OF CORRECTION

PATENT NO. : 6,885,376 B2
DATED : April 26, 2005
INVENTOR(S) : Tang-Petersen et al.

It is certified that error appears in the above-identified patent and that said Letters Patent is hereby corrected as shown below:

Drawings,
FIG. 6, "Rendering Pipeline 120a" should appear as -- Rendering Pipeline 600 --
FIG. 9, "Main Memory 909" should appear as -- Main Memory 908 --
FIG. 14B, "1430" should appear as -- 1440 --

Column 9,
Line 7, "1430" should appear as -- 1440 --

Column 11,
Line 46, "framer" should appear as -- frame --

Column 18,
Line 26, "arid" should appear as -- and --

Signed and Sealed this

Second Day of August, 2005

JON W. DUDAS
*Director of the United States Patent and Trademark Office*